United States Patent [19]

Nishida et al.

[11] Patent Number: 5,750,218
[45] Date of Patent: May 12, 1998

[54] BIODEGRADABLE ALIPHATIC POLYESTER, MELT-EXTRUSION FILM THEREOF, AND PROCESS FOR THE PRODUCTION THEREOF

[75] Inventors: Haruo Nishida; Mitsuhiro Yamashita; Yoshiki Ochi; Tetsuo Kuwaki, all of Tokuyama, Japan

[73] Assignee: Tokuyama Corporation, Tokuyama, Japan

[21] Appl. No.: 428,640

[22] Filed: Apr. 25, 1995

[30] Foreign Application Priority Data

Jun. 22, 1994 [JP] Japan ................................ 6-139905

[51] Int. Cl.$^6$ .................................................... B32B 1/08
[52] U.S. Cl. .......................... 428/35.5; 528/220; 528/222; 528/361; 528/365; 528/366; 528/403; 528/408; 528/417; 524/700; 524/401; 524/443; 428/35.5; 428/35.7; 428/35.8; 428/402
[58] Field of Search .................... 528/361, 365, 528/366, 403, 408, 417, 220, 222; 524/700, 401, 443; 428/35.5, 35.7, 35.8, 402

[56] References Cited

U.S. PATENT DOCUMENTS

| 4,080,356 | 3/1978 | Gergen et al. | 523/522 |
| 4,090,996 | 5/1978 | Gergen et al. | 524/505 |
| 4,797,447 | 1/1989 | Gergen et al. | 525/92 |
| 4,868,243 | 9/1989 | Gelles et al. | 525/64 |
| 5,281,663 | 1/1994 | Gelles et al. | 525/64 |

*Primary Examiner*—Samuel A. Acquah
*Attorney, Agent, or Firm*—Sherman and Shalloway

[57] ABSTRACT

A process for the production of biodegradable aliphatic polyester particles by (co)polymerizing 2-oxetanone or a mixture containing at least 80% by weight of 2-oxetanone and up to 20% by weight of a cyclic ester or cyclic ether other than 2-oxetanone in the presence of a polymerization initiator supported on a carrier in which an ion polymerization initiator is supported on poly(2-oxetanone) in a liquid medium having a solubility parameter of about 15 to about 18 MPa$^{1/2}$ and being capable of dissolving 2-oxetanone, and in a polymerizing apparatus having an internal surface formed of a material which is free of polarity or whose polarity is very small, to form a particulate aliphatic polyester; and a biodegradable aliphatic polyester melt-extrusion film, which comprises the biodegradable aliphatic polyester having a weight average molecular weight of 20,000 to 2,000,000, and having a water vapor transmission rate of 300 to 700 g/m$^2$·24 hours·25 μm and heat-fusing strength of 500 to 5,000 gf/15 mm.

9 Claims, 4 Drawing Sheets yeast extact 250ppm
30 °C, 31 days.
$CFU \cdot g^{-1}$: colony-formation-unit /g sample nutrient broth 8000 ppm
30 °C, 6 days
CFU·g$^{-1}$ : colony-formation-unit/g sample

BIODEGRADABLE ALIPHATIC POLYESTER, MELT-EXTRUSION FILM THEREOF, AND PROCESS FOR THE PRODUCTION THEREOF

DETAILED DESCRIPTION OF THE INVENTION

The present invention relates to a biodegradable aliphatic polyester, a melt-extrusion film thereof and a process for the production thereof.

The present invention relates to a film obtained by melt-extruding a biodegradable aliphatic polyester which decomposes under the activity of microorganisms in environments and a biodegradable bag.

As waste disposal have come to be a social issue, studies are being made in various fields to exploit waste as resources. For example, studies are being made to compost kitchen garbage coming from private houses as one of means of exploiting waste as resources. Actually, kitchen garbage is collected upon being classified depending on the content in many areas, and it is treated in compost plants.

Paper bags are used in collecting classified kitchen garbage which is to be utilized for composting today. Paper is a natural material and can therefore be composted, while it involves many problems. For example, paper is easily broken due to water contained in garbage, contents cannot be seen through paper since it is non-transparent so that it is difficult to prevent the inclusion of garbage that cannot be composted, a string of a natural material is required for closing a paper bag, paper is bulky so that its storage requires a large space, and paper shows a low biodegradation rate. In addition to these problems in use, paper involves a problem concerning global environmental preservation or the consumption of wood resources. These problems are some factors which hinder the exploitation of garbage as resources.

It is plastic waste that causes the greatest problem when waste is classified and gathered. In particular, plastic films cause some serious problems. That is, scraps of plastic films are often found in environments, plastic films cannot be expected to decompose to become soil, plastic films generate a large amount of combustion heat so that they are liable to damage an incineration furnace, and plastic films have an apparent large volume so that they decrease the life of a land reclamation site. A biodegradable plastic material attracts attention as one of materials which can overcome the above problems of plastic waste.

For example, it is desired to use a biodegradable plastic material for producing a bag for kitchen garbage, which bag is suitable for composting kitchen garbage. Specifically, it is urgently required to develop a material which has water resistance so that it is free from breaking due to water contained in kitchen garbage, which is transparent or semi-transparent so that contents can be seen through it, which is sufficiently thin and not bulky, which can be closed by binding its top (entrance) portion without any string, and which has strength sufficient for enduring the weight of contents.

For bags for fertilizers and bags for agricultural, forestry and horticultural waste in addition to bags for kitchen garbage, it is desired to develop a material which can be exploited as a resource after contents are taken out or which can be used or exploited as a resources without taking contents out.

In recent years, a variety of biodegradable plastic materials have been developed. However, no material has been developed which can satisfy biodegradability, film formability, processability and physical properties and which can be utilized generally for coping with decreasing the problem of waste disposal.

For example, poly(3-hydroxybutyric acid) biosynthesized by microorganisms has a melting point and a decomposition temperature which are close to each other so that it has a problem on moldability. Further, blends of chemically synthesized polymers with starch have a problem in water resistance, and the chemically synthesized polymers have a problem in biodegradability.

It is known that poly(2-oxetanone) which is a polyester synthesized from 2-oxetanone is well decomposed by the activity of an enzyme which microorganisms secrete, and its development is desired as a material that can cope with the problem of plastic waste (Mukai et al, Collection of Papers on Polymer (Kobunshi Ronbunshu), Vol. 50, No. 10, 715–722 (1993)).

The reaction scheme of polymerization from 2-oxetanone to poly(2-oxetanone) is as follows.

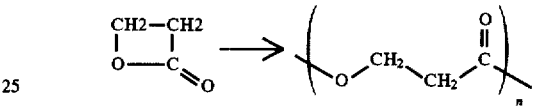

It is well known since R. D. Fields et al reported in 1975 that poly(2-oxetanone) is a material having excellent biodegradability (R. D. Fields and F Rodriguez, Proc. Int. Biodegradation Symp. 3rd, 775 (1975)), while there are not many reports which discuss the physical properties thereof other than its biodegradability. Kagiya et al report that a solution of poly(2-oxetanone) having an intrinsic viscosity [η] of 0.5 or more has the capability of forming a cast film, and that a solution of poly(2-oxetanone) having an intrinsic viscosity of 1 or more has the capability of forming a fiber and the capability of forming a film which can be cold-stretched (T. Kagiya, T. Sanoh and K. Fukui, Industrial Chemistry Journal, Vol. 67, No. 6, 951 (1964)). Wasai et al make spectroscopic studies of structures of a film obtained by forming a film from chloroform by a solvent casting method and stretching the film 500 to 700% at room temperature or in hot water at 65 C. (T. Wasai, T. Saegusa and J. Furukawa, Industrial Chemistry Journal, Vol. 67, No. 4, 601 (1964)). Mathisen et al report that a film formed by compressing poly(2-oxetanone) between two Mylar foils under heat to prepare a 0.5 mm thick film and stretching the film, has an excellent tensile strength value of 103 MPa (T. Mathisen, M. Monica and A. C. Albertsson, Journal of Applied Polymer Science, Vol. 42, 2365 (1991)).

As described above, the development of poly(2-oxetanone) remains at the stage of an experimental scale, and no reports clearly say that a film satisfying practically industrially sufficient properties is produced. Concerning the film properties, reports simply say its tensile strength and melting point. The reason therefor is presumably that it is difficult to synthesize a poly(2-oxetanone) which has a high molecular weight sufficient for forming a film.

That is, although the polymerization of poly(2-oxetanone) has been and is studied as described above, there is no process established for producing a poly(2-oxetanone) having a necessarily and sufficiently high molecular weight as a plastic material, generally at least 100,000, rationally on an industrial scale.

When a polymer is produced, not only the polymerization method, yield and molecular weight of the above polymer are naturally important, but also the method of isolating the polymer after the polymerization is very important. The method of isolating a polymer is closely related to the polymerization method. The operation after the polymerization is greatly influenced by the state of a polymer, i.e., by whether it is in the form of a solution or a mass, particles or a powder, when the polymer is taken out of an apparatus after the polymerization.

When a polymer is produced by solution polymerization, the solution after the polymerization is a viscous solution, and it is required to precipitate the polymer from the solution. As a result, a large amount of a solvent is required for the precipitation. When a polymer is produced by mass polymerization, it is required to heat the polymer at a temperature higher than the melting point of the polymer for taking the polymer out. This method is not suitable for a poly(2-oxetanone) which is thermally decomposable. When a polymer is produced by precipitation or suspension polymerization, the polymer is obtained in the state of particles or a powder, and the polymer can be therefore isolated by filtration alone. That is, the isolation of the polymer is very simple. Further, there is seed polymerization that is similar to the precipitation or suspension polymerization. Tsubokawa et al report a process for producing a complex in which using carbon black or carbon whiskers as a base material, poly(2-oxetanone) is grafted on the base material, by a bulk polymerization method or by a solution polymerization method using dichloromethane or nitrobenzene (Journal of Polymer Science: Polymer Chemistry Edition, Vol. 20, 3297 –3304 (1982), Journal of Applied Polymer Science, Vol. 28, 2381 –2387 (1983), Collection of Papers on Polymer (Kobunshi Ronbunshu), Vol. 42, 509 –516 (1985), Polymer Bulletin, Vol. 30, 421 –428 (1993), Polymer Journal, Vol. 25, 83 –89 (1993)). The above report discusses the formation of a complex by graft polymerization, and does not seek to produce poly(2-oxetanone) in the form of particles or a powder, so that the production of poly(2-oxetanone) in the above form has not yet been accomplished. Further, the graft polymer prepared by Tsubokawa has a molecular weight of 33,000 at the highest (intrinsic viscosity [η]=about 0.46), which molecular weight is far short of the industrially utilizable molecular weight, 100,000.

It is therefore an object of the present invention to provide a practically acceptable film containing a ring-opened structure of 2-oxetanone as its main structural component, excellent in biodegradability, mechanical properties and processability.

It is another object of the present invention to provide a particulate or powdery poly(2-oxetanone) having a high molecular weight suitable for producing the above practically acceptable film of the present invention.

It is further another object of the present invention to provide a process for industrially advantageously producing the above particulate or powdery poly(2-oxetanone) having a high molecular weight.

Other objects and advantages of the present invention will be apparent from the following description.

Figure 1A:
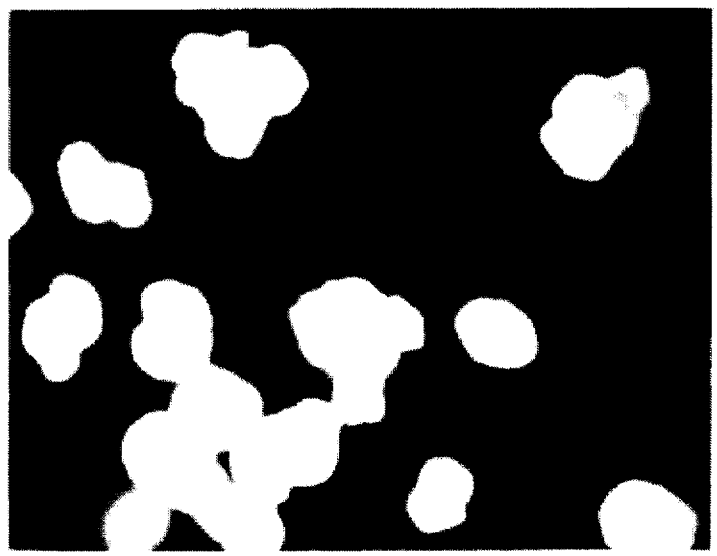
FIG. 1 shows polarizing microscopic photographs of starch particles (FIG. 1(a)) surfacetreated with a poly(2-oxetanone) prepared in Example 7 of the present invention and starch particles (FIG. 1(b)) as a raw material.

According to the present invention, the above objects and advantages of the present invention are achieved first by a biodegradable aliphatic polyester melt-extrusion film, which comprises a biodegradable aliphatic polyester containing a recurring unit of the formula (1),

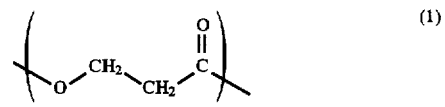

as a main recurring unit and having a weight average molecular weight of 20,000 to 2,000,000, and which has a water vapor transmission rate of 300 to 700 g/m²·24 hours·25 μm and heat-fusion strength of 500 to 5,000 gf/15 mm.

The aliphatic polyester film of the present invention basically comprises a biodegradable polyester containing a recurring unit of the above formula (1) as a main recurring unit.

A homopolyester consisting essentially of the above main recurring unit is a poly(2-oxetanone) and can be obtained by the ring-opening polymerization of 2-oxetanone or the dehydrative polycondensation of 3-hydroxypropionic acid.

The biodegradable polyester in the present invention includes a copolymer containing up to 20% by weight of a ring-opened structure derived from a cyclic ester compound and a cyclic ether compound other than 2-oxetanone, as a monomer unit in addition to the recurring unit of the formula (1). The cyclic ester includes β-butyrolactone, pivalolactone, δ-valerolactone and ε-caprolactone. The cyclic ether compound other than the 2-oxetanone includes ethylene oxide and propylene oxide.

The weight average molecular weight of the biodegradable aliphatic polyester in the present invention is preferably at least 20,000, more preferably at least 30,000. When the weight average molecular weight is less than 20,000, a film is liable to be insufficient in mechanical properties such as strength and extensibility in some cases depending on purpose or method in use, and hence, it is difficult to put the film to practical use. When the weight average molecular weight is at least 20,000, particularly at least 30,000, a film can have practically sufficient strength and extensibility. On the other hand, when the weight average molecular weight is extremely high, the polyester has a high viscosity when melt-extruded, so that it is difficult to process in some cases. For this reason, the weight average molecular weight of the biodegradable aliphatic polyester is properly 2,000,000 or less. Under general melt-extruding conditions, the molecular weight is liable to decrease by thermal decomposition, and the weight average molecular weight of melt-extruded film is liable to be 500,000 or less in many cases.

The term "water vapor transmission rate" in the present invention refers to a value obtained by measuring a film for a water vapor transmission rate according to the method defined by JIS Z-0208 and normalizing the found value to a value per a film thickness of 25 μm. The film of the present invention shows a high water vapor transmission rate as compared with general non-decomposable films, and the range thereof is 300 to 700 g/m²·24 hours·25 μm. Generally, the water vapor transmission rate increases by stretching a film. The water vapor transmission rate of the stretched film of the present invention is 450 to 700 g/m²·24 hours·25 μm. A solvent-cast film obtained by solvent-casting the biodegradable polyester which is to constitute the film of the invention, or a film obtained by press-molding the above biodegradable polyester, is liable to have fine vaprization pores, voids or pinholes, and often shows a water vapor transmission rate of more than 1,000 g/m²·24 hours·25 μm. Therefore, these films can be easily distinguished from the aliphatic polyester film formed by melt-extrusion, provided by the present invention (to be referred to as "melt-extrusion film" hereinafter).

The melt-extrusion film of the present invention can be also distinguished from a conventional solvent-cast film and a conventional press-molded film on the basis of water absorption percentage. The water absorption percentage refers to a value obtained by the measurement method defined in JIS K-7209. The film of the present invention generally shows a water absorption percentage of 1.0% by weight or less. The water absorption percentage value is greatly influenced by the form of a film surface, such as a fine concavoconvex form. A cast film or a film obtained by press molding is liable to have fine vaporization pores, voids or pinholes as described above, shows a water absorption percentage of more than 1.0% by weight in many cases, and can therefore be distinguished from the melt-extrusion film of the present invention.

The melt-extrusion film of the present invention can be obtained by a generally known melt-extrusion method. Preferred are a T-die extrusion method and an inflation method. Before the formation of the film, the biodegradable polyester of the present invention may be preferably pelletized.

In the formation of the film by the melt-extrusion, the barrel and T-die temperatures for preferably carrying out the formation are 80° to 180° C. more preferably 100° to 150° C. When these temperatures are lower than 80° C., undesirably, the melting of the biodegradable polyester of the present invention is insufficient. When they are higher than 180° C., undesirably, the biodegradable polyester of the present invention markedly undergoes thermal decomposition. However, the site of the barrel directly below a hopper may have a temperature of less than 80° C.

The melt-extrusion film of the present invention shows further improved mechanical properties when stretched. The melt-extrusion film may be stretched by any one of known stretching methods such as a roll stretching method and a stretching method using a tenter method. The melt-extrusion film can be stretched at a temperature in the range of from room temperature to 80° C. at a stretch ratio of 2 to 15. For increasing the processing rate, the stretching may be more preferably carried out at a temperature in the range of from 70° to 80° C. The stretching may be any one of monoaxial stretching for forming a monoaxially oriented film, consecutive biaxial stretching for forming a biaxially oriented film and simultaneous biaxial stretching for forming a plane-oriented film. When the melt-extrusion film is stretched, the tensile strength at break in the direction in which the film is stretched is generally 500 to 5,000 kgf/cm².

The melt-extrusion film of the present invention is formed from the above biodegradable polyester of the present invention. The biodegradable polyester is generally crystalline so that crystals formed in the film affect the transparency of the film. The transparency of the film changes depending upon the film thickness, and with an increase in the film thickness, the transparency decreases. For example, for preparing a bag of a semi-transparent or transparent film through which contents can be seen, the film thickness is preferably up to 300 gm. For maintaining the flexibility as a film and sufficient mechanical strength, the film thickness is preferably 1 to 100 μm.

When the melt-extrusion film of the present invention is practically used, it is mostly processed into a bag. For forming this biodegradable bag, it is an essential requirement that part of the film is heat-fusible. It is important that the bag has mechanical strength sufficient for keeping contents in the bag, and the heat-fused portion is required to have sufficient heat-fusion strength. The mechanical strength can be specifically evaluated on the basis of physical property values of tensile break strength,. while it is generally sufficient that the melt-extrusion film has mechanical strength equal to, or higher than, the mechanical strength of non-biodegradable films such as a polyethylene film. As the function of keeping contents in a bag, the heat-fusion strength of the heat-fused portion is particularly essential.

When the melt-extrusion film of the present invention is processed into a bag, generally, a heat sealer can be preferably used, and the heat-fusion conditions differ little by little depending upon the form of the film, additives and stretching conditions. This difference is caused by a difference in thermal physical properties, e.g., a change of melting point caused by a difference in stretch ratio. A melting point of the film of the present invention is generally measured with a differential scanning calorimeter, and the film generally has a melting point in the range of from 70° to 90° C. The film is heat-fused, generally, at a temperature between (melting point of the film—10° C.) and the melting point for 0.1 to 10 seconds, preferably for 0.5 to 5 seconds, more preferably 0.5 to 1 second. When the film is heat-fused as described here, the bag shows a fusion strength of 500 to 5,000 gf/15 mm. When the heat-fusing is carried out at a temperature between (melting point—5° C.) and the melting point, the bag shows a fusion strength of 1,000 to 5,000 gf/15 mm. When the heat-fusing is carried out at a temperature lower than (melting point—10° C.) or at a temperature lower than the melting point by more than 10° C., unpractically, the fusion strength is not sufficient, or the fusing under pressure takes a longer time. When the fusing is carried out at a temperature higher than the melting point, the fusing of the film proceeds to excess, and the fusion strength decreases.

The melt-extrusion film of the present invention may contain a filler in such an amount that the film properties are not impaired. The filler can be selected from known fillers, while an inorganic filler is preferred. Particularly, a salt of an alkaline earth metal is more preferred since it serves to stabilize the biodegradable polyester of the present invention.

The above alkaline earth metal includes calcium, magnesium and barium, while calcium and barium are particularly preferred in view of an influence on environments. Further, the salt of an alkaline earth metal includes chloride, sulfate, carbonate and silicate of an alkaline earth metal. Specific examples of the salt of an alkaline earth metal include chlorides such as calcium chloride and magnesium chloride; sulfates such as magnesium sulfate and barium sulfate; carbonates such as magnesium carbonate and calcium carbonate; and silicates such as calcium orthosilicate, calcium metasilicate, dicalcium silicate, tricalcium silicate, sodium calcium silicate, calcium aluminum silicate, magnesium orthosilicate, magnesium metasilicate, hydrous magnesium silicate such as talc, and calcium magnesium silicate. Of these alkaline earth metal salts, preferred are silicates, which have low water vapor absorption properties and are easy to handle. These alkaline earth metal salts may be used alone or in combination.

The above salt of an alkaline earth metal is incorporated preferably in an amount of up to 20% by weight based on the biodegradable polyester of the present invention.

The melt-extrusion film of the present invention may contain auxiliary components such as an antioxidant, a mold releasing agent, a weathering agent, an antistatic agent, a colorant, a reinforcing material, a surfactant and an inorganic filler as required for a purpose and use.

The melt-extrusion film of the present invention is formed by molding the biodegradable polyester of the present invention, so that it is well decomposed by an enzyme secreted by microorganisms. Moreover, it has been found that microorganisms which decompose the biodegradable polyester of the present invention are widely distributed in environments as will be explained in Referential Example, which has clearly proved that the biodegradable polyester of the present invention is therefore an excellent biodegradable plastic material.

Further, it has been found for the first time that the film of the present invention has a relatively high water vapor transmission rate and a relatively high water absorption percentage. This finding shows that the film has high hydrophilic nature. That is, this high hydrophilic nature of the film is one reason why the film of the present invention is easily decomposed by microorganisms.

Further, it has been also found for the first time that the film of the present invention has high heat-fusion strength, and the film of the present invention shows excellent performance when processed into a bag. This property is considered to be derived from an intermolecular cohesive force based on the polarity of the structure of the biodegradable polyester of the present invention.

The melt-extrusion film of the present invention is a highly practically useful plastic material which has mechanical strength and heat-fusion strength suitable, e.g., for practical use as a biodegradable bag and which also has hydrophilic nature suitable for biodegradation.

The melt-extrusion film of the present invention can be applied to a variety of products, for example, bags such as a bag for garbage to be collected and a bag for daily foods and necessities, sanitary goods such as a disposable diaper and sanitary items, agricultural, forestry and fishery materials such as a multi-film, a binding tape and a pot for seedlings, and food-related products such as a food-packaging material and an eggs-packaging pack. Bags are preferably prepared by heat-fusing at least part of the film of the present invention. Products formed of the melt-extrusion film of the present invention are decomposed by microorganisms when left in natural environments and converted to a fertilizer in a compost plant.

The process for the production of the biodegradable aliphatic polyester suitably used for producing the melt-extrusion film of the present invention will be explained hereinafter.

The process for the production of the biodegradable aliphatic polyester provided by the present invention comprises (A) (co)polymerizing 2-oxetanone or a mixture containing at least 80% by weight of 2-oxetanone and up to 20% by weight of a cyclic ester or cyclic ether other than 2-oxetanone, (B) in the presence of a polymerization initiator supported on a carrier, in which an ion polymerization initiator is supported on polymer particles of poly(2-oxetanone), (C) in a liquid medium having a solubility parameter of about 15 to about 18 $MPa^{1/2}$ and being capable of dissolving 2-oxetanone, and (D) in a polymerization apparatus having an internal surface formed of a material which is free of polarity or whose polarity is very small, to form a particulate aliphatic polyester.

As described above, the process of the present invention uses a polymerization apparatus having an internal surface formed of a material which is free of polarity or whose polarity is very small (to be sometimes referred to as "polymerization apparatus having a nonpolarized internal surface" hereinafter).

It is an essential requirement in the present invention to use a polymerization apparatus having a nonpolarized internal surface. The term "polymerization apparatus" includes not only a polymerization reactor to be described later but also all the polymerization equipment and accessories formed of the devices and parts which are used for the polymerization and to which a liquid phase of a polymerization system directly contacts at the time of polymerization, such as a baffle, a stirrer, a protection tube for a sensor for monitoring polymerization temperatures.

The polymerization reactor used for the polymerization is not specially limited, and can be selected from known polymerization reactors, such as a batch method polymerization reactor, e.g., an autoclave, a multi-stage polymerization reactor and a tube-shaped continuous polymerization reactor. The polymerization reactor may be equipped with a baffle and a concave and convex structure for homogeneous stirring on its internal surface portion. For stirring the polymerization system, generally, the polymerization reactor is internally provided with a stirrer, or the polymerization reactor per se has a function of stirring activity such as rotation or vibration.

The stirrer is not specially limited, and can be selected from known stirrers having various structures, such as paddle type, plate type, tilted paddle type, propeller type, saw blade type, turbine type, brumagin type, anchor type, helical type, screw type, up-and-down vibrator type and magnetic stirrer type stirrers.

The material free of polarity or almost free of polarity for forming a nonpolarized internal surface of the polymerization apparatus includes fluorine-containing resins such as an ethylene tetrafluoride resin, an ethylene tetrafluoride-propylene hexafluoride copolymer resin, an ethylene tetrafluoride-perfluoroalkylvinyl ether copolymer resin, an ethylene tetrafluoride-ethylene copolymer resin, an ethylene trifluoride chloride resin, a vinylidene fluoride resin, a polyvinyl fluoride resin, and an ethylene trifluoride chloride-ethylene copolymer resin, and polyolefin plastic resins such as polyethylene, polypropylene and poly(4-methylpentene).

In the present invention, it should be understood that the internal surface of the polymerization apparatus (to be sometimes referred to as "polymerization apparatus internal surface" hereinafter) refers to all the surfaces to which at least the liquid phase of a polymerization system directly contacts at a polymerization time, such as the surfaces of a baffle, a concave and convex structure, a stirrer and a protection tube for a sensor for monitoring polymerization temperatures.

Generally, it is sufficient to nonpolarize only the internal surface of the polymerization apparatus to which materials of the polymerization system directly contacts. However, 2-oxetanone is easily vaporized so that a line is sometimes clogged by the gas phase polymerization of gasified monomers. It is therefore preferred to nonpolarize the internal surfaces of a line for feeding various raw materials into the polymerizing reactor and various lines for recovering a product, a solvent, and the like.

It is one of the essential requirements of the present invention to nonpolarize the internal surface of the polymerization apparatus. The "nonpolarization" refers to decreasing or nullifying a dielectric constant and an ability to form a hydrogen bond. Further, the "nonpolarization" refers to decreasing a surface tension and surface energy. The polarity on a surface is evaluated on the basis of a contact angle as an index. Generally, a metal surface has high polarity and a polar substance is liable to easily adhere. The "nonpolarization" means chemically or physically bringing this surface having high polarity into a state where the polarity is very low or absent. The "nonpolarization" on the polymerization apparatus internal surface in the present invention can be evaluated by a proportion of poly(2-oxetanone) adhering to the internal surface on the basis of a total polymer. For effectively proceeding with the treatment operation after the polymerization, the proportion of an adhering polymer is preferably up to 10%, more preferably up to 5%.

The method for the above nonpolarization is not specially limited, and can be selected from known methods without any limitation. Preferred is a method in which the internal surface of the polymerization apparatus is coated with a compound having nonpolar group such as a fluoroalkyl group and a saturated alkyl group (to be referred to as "nonpolar compound" hereinafter) or with a resin having nonpolar group such as a fluorine-containing resin having a fluoroalkyl group or a saturated alkyl group (to be referred to as "nonpolar resin" hereinafter), a method in which the polymerization apparatus as a whole or the internal surface is made of a nonpolar resin, or a method in which an internal container of which at least the internal surface is nonpolarized with any one of the above methods is provided in the polymerization apparatus. These methods may be employed alone or in combination.

Of the above method for the nonpolarization, particularly preferred is the method in which the polymerization apparatus internal surface is coated with a fluorine-containing resin which is a typical nonpolar resin or a nonpolar compound having a fluoroalkyl group, the method in which the apparatus as a whole or the internal surface portion is made of a fluorine-containing resin, or the method in which an internal container made by one of these methods is provided in the polymerization apparatus for the following reasons. Not only the nonpolarization effect is achieved, but also the internal surface is imparted with oil-repellency, heat resistance and oil resistance, so that any solvent can be used in the polymerization apparatus and that the polymerization temperature can be set in a broad range.

As the method of nonpolarizing the polymerization apparatus internal surface of a metal, ceramic, glass or a metal or ceramic having glass lining by coating, preferred is a method in which the internal surface is treated with a nonpolar compound such as a silane coupling agent having nonpolar group such as a fluoroalkyl group or a saturated alkyl group (to be referred to as "nonpolar silane coupling agent" hereinafter), a method in which a coating agent containing a nonpolar resin is applied to the internal surface, or a method of processing the internal surface with a resin in which the internal surface is coatingtreated by baking a nonpolar resin such as processing with a fluorine resin. Further, there may be properly employed a generally used water-repelling treatment method using a nonpolar compound.

Specific examples of the nonpolar compound preferably include nonpolar silane coupling agents such as heptadecafluorodecyltrimethoxysilane, heptadecafluorodecylmethyldimethoxysilane, heptadecafluorodecylmethyldichlorosilane, tridecafluorooctyltrimethoxysilane, tridecafluorooctyltrichlorosilane and trifluoropropyltrimethoxysilane; reactive surface treating agents such as pentadecafluorooctaonoic acid, perfluorodecanoic acid, pentafluoropropionic anhydride, perfluorooctanoic anhydride, trifluoroethyl acrylate, trifluoroethyl methacrylate and trifluoromethylbenzoyl chloride; and surface coating agents used for waterrepelling, oil-repelling processing of a fiber in the form of an aqueous dispersion or organic solvent solution of a polymer formed mainly from acrylate or methacrylate containing perfluoro group.

The fluorine-containing resin includes an ethylene tetrafluoride resin, an ethylene tetrafluoride-propylene hexafluoride copolymer resin, an ethylene tetrafluoride-perfluoroalkylvinyl ether copolymer resin, an ethylene-tetrafluoride-ethylene copolymer resin, an ethylene trifluoride chloride resin, a vinylidene fluoride resin, a polyvinyl fluoride resin and an ethylene trifluoride chloride-ethylene copolymer resin.

The polyolefin resin includes polyethylene, polypropylene and poly(4-methylpentene).

The method of processing the above polymerization apparatus internal surface with a resin can be selected from known methods without any limitation. Preferred is a method in which an emulsion prepared by dispersing the above nonpolar resin is blown to the internal surface and then baked, a method in which a molded article of a nonpolar resin prepared to have the same form as that of the internal surface is attached to the internal surface with an adhesive, or a rotary lining-forming method in which a nonpolar resin base material is placed in a polymerization apparatus and the apparatus as a whole is rotated with heating the base material to spread the molten nonpolar resin over the internal surface.

The method of making the polymerization apparatus from a nonpolar resin preferably includes a method in which a polymerization apparatus as a whole or the internal surface thereof is made by hollowing it from a nonpolar resin base material or by cutting the base material, and a method in which a polymerization apparatus as a whole or the internal surface thereof is made by any one of known melt molding method such as injection molding, compression molding or vacuum forming.

The polymerization apparatus produced by the above method is nonpolarized and therefore does not need the treatment of its internal surface, but it is required to nonpolarize an adhesive layer required for assembling parts of the polymerization apparatus, parts formed of other material, and the internal surface of various lines to which a liquid phase and a gaseous phase directly contact.

The method of nonpolarizing the polymerization apparatus internal surface is properly selected from the above methods depending upon the structure of the polymerization apparatus and polymerization conditions such as a solvent, polymerization temperature and polymerization time.

However, in some combination of the nonpolarization method and polymerization conditions, the coating sometimes undergoes peeling or cracking due to its swelling based on the infiltration of a solvent. When the fluorine-containing resin is used, the internal surface shows no change to almost all solvents and has excellent heat resistance, and the so-produced polymerization apparatus can be preferably used under all the polymerization conditions.

The liquid medium used in the above process of the present invention has a solubility parameter in the range of about 15 to about 18 MPa$^{1/2}$, and can dissolve 2-oxetanone.

The solubility parameter is an index for estimating the solubility of liquids in each other, and is expressed by a square root $((\Delta E^v/V)^{1/2})$ of a cohesive energy density which is a value obtained by dividing a molar evaporation energy $(\Delta E^v)$ of a liquid by a molar volume V of the liquid. Whether two liquids are dissolved can be discussed depending upon a magnitude of a free energy difference $(\Delta G)$ between before and after the two liquids are mixed. According to thermodynamics of regular solution, $\Delta G$ is represented as $$\Delta G = \Delta H - T\Delta S$$
$$\Delta H = V_m \{(\Delta E_1^v/V_1)^{1/2} - (\Delta E_2^v/V_2)^{1/2}\}^2 \phi_1 \phi_2$$
$$\Delta S = -R\{n_1 \ln\phi_1 + 2\ln\phi_2\}$$

The above subscripts, 1 and 2, are used for distinguishing two liquid substances. $\phi_1$ and $\phi_2$ are each a volume percentage. $n_1$ and $n_2$ are each a molar amount, and $V_m$ is a volume. From the above equations, $\Delta H$ is 0 or more, and $-T\Delta S$ is a negative value. Therefore, when the absolute value of $(\Delta E_1^v/V_1)^{1/2} - (\Delta E_2^v/V_2)^{1/2} - (\Delta E_2^v/V_2)^{1/2}$ is 0 or sufficiently small, $\Delta G<0$, and liquid substances 1 and 2 are dissolved.

The good solvent for poly(2-oxetanone) has a solubility parameter in the range of approximately from 19.0 (chloroform) to 19.8 MPa$^{1/2}$ (dichloromethane), and the smallest value of the solubility parameter of a solvent that can dissolve poly(2-oxetanone) is 18.6 MPa$^{1/2}$ (tetrahydrofuran). Therefore, the solvent having a solubility parameter of about 15 to about 18 MPa$^{1/2}$ in the present invention refers to a solvent which does not dissolve poly(2-oxetanone).

On the other hand, 2-oxetanone shows a high solubility parameter of 27.2 MPa$^{1/2}$, while it is a low-molecular-weight compound and is therefore soluble in most of solvents having a solubility parameter in the range of from about 15 to about 18 MPa$^{1/2}$. However, it is not soluble in octane (15.6 MPa$^{1/2}$) and cyclohexane (16.8 MPa$^{1/2}$) having a weak ability to form a hydrogen bond. The solubility of 2-oxetanone is greatly influenced not only by solubility parameter but also by mutual action based on ability to form a hydrogen bond. However, solvents having strong ability to form a hydrogen bond, such as alcohol; amine, carboxylic acid and carboxylic anhydride inhibits the polymerization of 2-oxetanone since they react with 2oxetanone and a living polymer terminal. Therefore, the solvent used in the present invention is preferably a solvent inert to the polymerization, whose molecule contain neither active hydrogen such as alcoholic hydrogen and carboxylic acid hydrogen nor active heteroatoms such as nitrogen and phosphorus.

Examples of the solvent preferred in the present invention include chlorinated hydrocarbons such as n-propyl chloride (solubility parameter 17.4 MPa$^{1/2}$, parenthesized values hereinafter in this paragraph refer to solubility parameter), isopropyl chloride (16.6), n-butyl chloride (17.3), 2-chlorobutane (16.0), isobutyl chloride (16.6), n-pentyl chloride (17.0), 1-chloro-3-methylbutane (16.7), 2-chloro-2-methylbutane (15.8), 1-chloro-2,2-dimethylpropane (15.8) and n-hexyl chloride (17.1); fatty acid esters such as isopropyl formate (17.3), isobutyl formate (16.8), tert-butyl formate (16.4–16.7), n-propyl acetate (18.0), isopropyl acetate (17.2), tert-butyl acetate (16.3) and ethyl propionate (17.9); non-cyclic ethers such as ethyl methyl ether (15.6), propyl methyl ether (15.4), propyl ethyl ether (15.4), di-n-propyl ether (15.4), n-butyl methyl ether (15.6), di-n-butyl ether (15.7), dimethoxymethane (16.2), dimethoxyethane (15.9) and diethoxyethane (17.0); and aliphatic ketones such as pentan-3-one (18.0), hepaten-4-one (18.0) and isopropyl methyl ketone (18.0).

Of the above solvents, particularly preferred are solvents having a boiling point of 30° to 80° C. When a solvent having a boiling point of lower than 30° C. is used, it is always required to keep the polymerization system under pressure when the polymerization is carried out at 30° C. or higher, and the polymerization apparatus is thus limited. Further, there is another problem in that it is difficult to recover the solvent after the polymerization. In the case where a solvent having a boiling point of higher than 80° C. is used, poly(2-oxetanone) is sometimes fused to adhere when the polymer is dried under heat for separating the solvent from poly(2-oxetanone), since poly(2-oxetanone) has a melting point around 80° C.

The solvent having a boiling point of 30° to 80° C. includes chlorinated hydrocarbons such as n-propyl chloride (boiling point 46.6° C., parenthesized values hereinafter in this paragraph refer to boiling points), isopropyl chloride (34.8), n-butyl chloride (78.44), 2-chlorobutane (68.25), isobutyl chloride (68.85) and tert-butyl chloride (50.7); fatty acid esters such as isopropyl formate (68); and non-cyclic ethers such as propyl methyl ether (39), propyl ethyl ether (63.6), isopropyl methyl ether (32), isopropyl ethyl ether (54), n-butyl methyl ether (70) and dimethoxymethane (41–42). Of these solvents, particularly preferred are chlorinated hydrocarbon solvents in view of reaction activity for the polymerization.

The solvent is required in such an amount that the polymerization heat can be fully removed, and the optimum amount differs depending upon the amount of a polymerization initiator and polymerization temperature, while the amount of the solvent based on 2-oxetanone is generally 100 to 1,000% by volume, preferably 200 to 700% by volume.

The present invention uses, as a starting material, 2-oxetanone or a mixture of at least 80% by weight of 2-oxetanone with up to 20% by weight of a cyclic ester or a cyclic ether other than 2-oxetanone.

The cyclic ester other than 2-oxetanone preferably includes β-butyrolactone, pivalolactone, δ-valerolactone and ε-caprolactone. The cyclic ether preferably includes ethylene oxide and propylene oxide.

The polymerization initiator used in the present invention is a polymerization initiator supported on a carrier in which an ion polymerization initiator is supported on polymer particles of poly(2-oxetanone).

The form of the polymer particles of poly(2-oxetanone) used as a carrier is not specially limited. For example, the form may be any one of sphere, ellipsoid, a plate, a fiber, a rod and an irregular shape. The major diameter and miner diameter are preferably 1 mm to 1 µm, more preferably 500 µm to 10 µm. When the particle size is smaller than 1 µm, the particles are liable to form aggregates. When the diameter is large, the particles sometimes exhibit the activity to decrease the polymerization rate. The amount of the particles based on the monomer is 0.1 to 50% by weight, preferably 0.5 to 20% by weight. When this amount is too small, the polymerization is no better than a general precipitation polymerization, and aggregates are liable to form. When the amount of the particles is more than 50% by weight, there is not any further effect.

The above poly(2-oxetanone) particles can be prepared by mere precipitation polymerization of 2-oxetanone. Further, the particles can be also prepared by forming poly(2-oxetanone) by bulk polymerization, followed by cutting, milling or pulverizing. Further, the particle, can be also obtained by pouring a solution of poly(2-oxetanone) in a solvent such as chloroform into a solvent such as methanol to precipitate them. One method of preparing preferred poly(2-oxetanone) particles is to directly use particulate poly(2-oxetanone) obtained by the process for the production of poly(2-oxetanone), provided by the present invention. Therefore, particulate poly(2-oxetanone) formed by the process for the production of poly(2-oxetanone), provided by the present invention, can be conveniently used as carrier particles for the subsequent polymerization of 2-oxetanone.

The polymerization initiator is preferably selected from anionic polymerization initiators for obtaining a poly(2-oxetanone) having a high molecular weight. More preferred is a salt formed of stabilized cation and carboxylate anion. The term "stabilized cation" refers to a cation of which the cation atom has low electrophillic nature and which undergoes almost no chemical change. Specifically, one example thereof is a cation in which a substituent bonding to nitrogen, phosphorus or sulfur atom present as a cation is an electron donor such as an alkyl group or a resonance-stabilized group such as a phenyl group and to which an easily dissociable group such as hydrogen does not bond. Another example is a cation in which an electron-donating ligand coordinate-bonds to an alkali metal such as potassium or sodium, the alkali metal having low electrophillic nature.

Examples of the polymerization initiator that can be suitably used include quaternary ammonium carboxylate initiators such as tetramethylammonium acetate, tetraethylammonium acetate, tetrabutylammonium acetate, tetramethylammonium pivalate, tetraethylammonium pivalate, tetrabutylammonium pivalate, tetramethylammonium propionate, tetraethylammonium propionate, tetrabutylammonium propionate, bis(tetramethylammonium) adipate, bis(tetramethylammonium)-1,18-octadecanedicarboxylate and tris(tetramethylammonium)-1,3,5-pentanetricarboxylate; betaine carboxylate initiators such as anhydride of carboxymethyltrimethylammonium hydroxide, octylbetaine, decylbetaine, undecylbetaine, dodecylbetaine, tetradecylbetaine and hexadecylbetaine; phosphonium carboxylate initiators such as tetraethylphosphonium acetate, bis (tetraethylphosphonium) adipate and tris (tetraethylphosphonium)-1,3,5-pentanetricarboxylate; sulfonium carboxylate initiators such as trimethylsulfonium acetate; sulfooxonium carboxylate initiators such as trimethylsulfooxonium acetate; pyridinium carboxylate initiators such as N-methylpyridinium acetate and N-cetylpyridinium acetate; and initiators of crown ether complexes of alkali metal carboxylates such as potassium acetate/18-crown-6-ether, potassium acetate/dibenzo-18-crown-6-ether, sodium acetate/15-crown-5-ether, dipotassium adipate/18-crown-6-ether and tripotassium 1,3,5-pentanetricarboxylate/18-crown-6-ether. These polymerization initiators may be used in admixture.

The amount of the polymerization initiator differs depending upon the kind and use mode of the initiator. Generally, the amount of the polymerization initiator is varied for adjusting the molecular weight and the polymerization rate. The amount of the polymerization initiator is increased for increasing the polymerization rate. However, when an excess of the polymerization initiator is used, the formed polymer sometimes has an insufficient molecular weight. The amount of the polymerization initiator is decreased for obtaining a polymer having a higher molecular weight. When a polyfunctional polymerization initiator is used, the polymerization rate can be increased without decreasing the molecular weight. Generally, the polymerization initiator is used in an amount of 1 equivalent or less, preferably 0.1 to 0.001 equivalent, on the basis of 2-oxetanone as a monomer.

In the present invention, the above polymerization initiator is used as a polymerization initiator supported on a carrier, in which the polymerization initiator is supported on particles of poly(2-oxetanone). When 2-oxetanone is polymerized in the presence of a salt formed of a stabilized cation and a carboxylate anion, the polymerization proceed as a living polymerization in principle so that particles of poly(2-oxetanone) formed by the process for the production of poly(2-oxetanone), provided by the present invention, already supports a small amount of a polymerization initiator. Therefore, the polymerization of 2-oxetanone can be initiated when the above-formed particles are directly used as a polymerization initiator supported on a carrier without any fresh polymerization initiator supported thereon. However, it is preferred to use a polymerization initiator in which a fresh polymerization initiator is additionally supported on surfaces of the above particles, for accomplishing a proper polymerization rate and a proper molecular weight.

Although not specially limited, the method of allowing the carrier particles to support the polymerization initiator includes a method in which the particles and the polymerization initiator in the form of a solution are mixed and the solvent is removed by vaporization, a method in which the particles and the polymerization initiator in the form of a solid are mixed with stirring, a method in which the particles are swollen in the presence of a proper solvent and the polymerization initiator is allowed to penetrate, and adhere to, the swollen particles, and the particles and the polymerization initiator are chemically combined.

The solvent for preparing the above polymerization initiator in the form of a solution is properly selected depending upon the kind of the polymerization initiator, while it is generally preferred to use a solvent which can be easily removed by vaporization and which does not prevent the polymerization of 2-oxetanone when it remains.

Examples of the solvent that can be suitably used include acetonitrile, acetone, chloroform, dimethylsulfoxide, tetrahydrofuran, dioxane, toluene and benzene. Further, methanol, ethanol and water can be used, and they can be removed by vaporization.

When poly(2-oxetanone) is industrially produced according to the present invention, the polymerization is preferably carried out at a temperature between 20° and 60° C. Further, the polymerization is desirably completed within 48 hours, preferably within 20 hours. When the polymerization is carried out at a low temperature, the polymerization rate is low, while the degree of chain transfer is advantageously low. When the polymerization is carried out at a high temperature, the polymerization rate is high, while the chain transfer reaction is activated to decrease the molecular weight of the polymer. Further, the polymerization conditions differ depending upon the kind and amount of the polymerization initiator. When the amount of the polymerization initiator is large, the polymerization can be carried out at a lower temperature in most of cases. When a polyfunctional polymerization initiator is used, there are employed polymerization conditions different from those when a monofunctional polymerization initiator is used, as required depending upon a purpose. In view of a polymerization rate, a molecular weight and a kind of the polymerization initiator, the above production conditions are preferred in the process of the present invention, while a polymer for some purposes may be produced under conditions outside the above production conditions.

The termination point of the polymerization can be determined by taking out part of a liquid phase and part of a gaseous phase in the polymerization system and analyzing them for remaining amounts of 2-oxetanone with a gas chromatograph or a liquid chromatograph. Generally, the polymerization is terminated when the monomer decreases to 10% or less, preferably 5% or less, while the polymerization may be terminated as required for a purpose.

After the polymerization, the formed polymer is separated from co-present substances such as a solvent by a known method. The separation can be carried out by at least one of filtration, separation of a solvent and unreacted monomer with a spray drier, washing of the formed polymer with a monomer-extracting solvent, and separation of a solvent and a monomer under heat or by circulating dry air.

In the process of the present invention, it is not particularly required to post-treat the polymerization apparatus after the polymerization since the amount of an adhering polymer (so-called scale) is very small. The polymerization apparatus can be used as it is and raw materials may be charged for subsequent polymerization. As required, the polymerization apparatus may be properly cleaned by flushing it with a polymerization solvent according to a known washing method.

Further, studies by the present invention have revealed the following. Even when the above polymerization initiator supported on a carrier is replaced with a polymerization initiator supported on a carrier in which carrier particles having poly(2-oxetanone) on their surfaces are allowed to support an ion polymerization initiator, there can be obtained biodegradable aliphatic polyester particles which can stand comparison with those polyester particles obtained by the above process.

According to the present invention, therefore, there is provided a process for the production of biodegradable aliphatic polyester particles, which comprises (A) (co)polymerizing 2-oxetanone or a mixture containing at least 80% by weight of 2-oxetanone and up to 20% by weight of a cyclic ester or cyclic ether other than 2-oxetanone, (B) in the presence of a polymerization initiator supported on a carrier in which an ion polymerization initiator is supported on carrier particles of an organic polymer material other than poly(2-oxetanone) or an inorganic material, a poly(2-oxetanone) being present on surfaces of the carrier particles, (C) in a liquid medium having a solubility parameter of about 15 to about 18 MPa$^{1/2}$ and being capable of dissolving 2-oxetanone, and (D) in a polymerization apparatus having an internal surface formed of a material which is free of polarity or whose polarity is very small, to form a particulate aliphatic polyester.

The starting material(s) (A), the liquid medium (C) and the polymerization apparatus (D) used in this method are the same as those used in the already specified process of the present invention. It should be therefore understood that explanations in the already specified process can directly apply to the above process unless otherwise specified.

The above process differs from the already specified process of the present invention in that the above process uses a polymerization initiator supported on a carrier in which carrier particles of an organic polymer material other than poly(2-oxetanone) or an inorganic material, having poly(2-oxetanone) on surfaces of the carrier particles, are allowed to support an ion polymerization initiator.

The form of the carrier particles is not specially limited, and it can be any one of sphere, ellipsoid, a plate, a fiber, a rod and an irregular shape. The major diameter and minor diameter are preferably 1 mm to 1 μm, more preferably 500 μm to 10 μm. When the particle size is smaller than 1 μm, the particles are liable to form aggregates. When the diameter is large, the particles sometimes exhibit the activity to decrease the polymerization rate.

The amount of the particles based on the monomer is 0.1 to 50% by weight, preferably 0.5 to 20% by weight. When this amount is too small, the polymerization is no better than a general precipitation polymerization, and aggregates are liable to form. When the amount of the particles is more than 50% by weight, there is not any further effect.

The organic material to constitute the carrier is preferably an organic material which is not dissolved in, and is not swollen with, a solvent having a solubility parameter of about 15 to about 18 MPa$^{1/2}$ and can dissolve 2-oxetanone, used in the present invention. The organic material includes synthetic polymers such as polyethylene, polypropylene, nylon-6 and nylon-66; and polymers having a low polymerization degree such as wax. Particularly preferred is a biodegradable material.

Specific examples of the biodegradable material include natural polymers such as raw starch particles, cellulose, pulp and natural rubber; saccharides such as saccharose, dextrose and trehalose; aliphatic polyesters and copolyesters such as poly(3-hydroxybutylate), poly(3-hydroxyvalerate), a (3-hydroxybutylate/3-hydroxyvalerate) copolymer, a (3-hydroxybutylate/4-hydroxybutylate) copolymer, poly(ε-caprolactone), poly(δ-valerolactone), polylactic acid, polyglycolic acid, polyethylene adipate, polyethylene succinate, polybutylene succinate and random, block and graft copolymers of these; and aliphatic carbonates such as polyethylene carbonate. Of these biodegradable materials, more preferred are natural polymers such as raw starch particles in view of their excellent biodegradability.

Examples of the inorganic particles that can be suitably used include silicates such as talc, clay, mica, glass short fiber, glass balloon, glass beads, calcium silicate, montmorillonite and bentonite; oxides such as silica, diatomaceous earth, alumina, titanium oxide, iron oxide, magnesium oxide, pumice, pumice balloon and quartz powder; hydroxides such as aluminum hydroxide and magnesium hydroxide; carbonates such as calcium carbonate, magnesium carbonate and dolomite; sulfates such as calcium sulfate, barium sulfate and ammonium sulfate; and chlorides such as calcium chloride and magnesium chloride. Of these inorganic materials, silicates are more preferred since they have a less influence on the polymerization.

The method of allowing poly(2-oxetanone) to be present on surface of particles of the organic polymer material or inorganic material is not specially limited if poly(2-oxetanone) can be attached to the biodegradable organic particles or inorganic particles. Preferred methods include a gaseous phase polymerization method in which surfaces of carrier particles are allowed to support a polymerization initiator for 2-oxetanone, and gaseous 2-oxetanone is brought into contact with it to deposit poly(2-oxetanone) on the surfaces; a liquid phase polymerization method in which surfaces of carrier particles are allowed to support a polymerization initiator for 2-oxetanone and the polymerization initiator is brought into contact with 2-oxetanone in the form of a liquid or a solution to precipitate poly(2-oxetanone) on the surfaces; a casting method in which a solution of poly(2-oxetanone) in a solvent in which poly(2-oxetanone) is soluble and carrier particles are mixed and the solvent is dried to precipitate poly(2-oxetanone) on surfaces of the particles; a precipitation method in which carrier particles are dispersed in a solution of poly(2-oxetanone) and a poor solvent for poly(2-oxetanone) is added to the dispersion to allow poly(2-oxetanone) to adhere to particle surfaces while the poly(2-oxetanone) is deposited and precipitated; and a method in which carrier particles are dispersed in a solution of poly(2-oxetanone) and the dispersion is spray-dried to allow poly(2-oxetanone) to adhere to particle surfaces. Of these methods, the gaseous phase method and the liquid phase method are more preferred, since these methods enables the preparation of particles for seed polymerization which give more preferable results in seed polymerization.

Thus, according to the above process of the present invention, there is industrially advantageously produced a biodegradable aliphatic polyester which can be suitably used for the production of the biodegradable aliphatic polyester melt-extrusion film provided by the present invention.

Therefore, according to the present invention, there are also provided biodegradable aliphatic polyester particles excellent in handling properties, (a) which comprises a biodegradable aliphatic polyester containing a recurring unit of the formula (1),

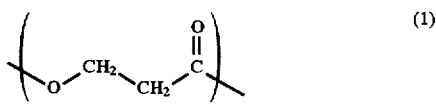

as a main recurring unit and having a weight average molecular weight of 20,000 to 2,000,000, (b) of which at least 70% by weight of the biodegradable aliphatic polyester particles is present in the particle diameter range of 150 μm to 3 mm in a particle size distribution histogram, and (c) which has a bulk specific gravity in the range of 0.3 to 0.6 g/ml.

The biodegradable aliphatic polyester particles of the present invention contain a recurring unit of the formula (1) as a main recurring unit. The biodegradable aliphatic polyester includes a copolymer composed of up to 20% by weight of a ring-opened structure from a cyclic ester compound and a cyclic ether compound other than 2-oxetanone, as a monomer in addition to the recurring unit of the formula (1). The cyclic ester includes β-butyrolactone, pivalolactone, δ-valerolactone and ε-caprolactone. The cyclic ether other than 2-oxetanone includes ethylene oxide and propylene oxide.

The weight average molecular weight of the biodegradable aliphatic polyester of the present invention is at least 20,000, preferably at least 30,000. When the weight average molecular weight is less than 20,000, the biodegradable aliphatic polyester as a film is sometimes insufficient in mechanical properties such as strength and extensibility for some purpose or method in use of the film. When the weight average molecular weight is extremely high, the biodegradable aliphatic polyester is hard to process since it shows a high viscosity when melt-molded. Therefore, the upper limit of the weight average molecular weight is properly 2,000,000.

In the particle size distribution histogram of the biodegradable aliphatic polyester particles of the present invention by sieving, at least 70% by weight, preferably at lest 80% by weight, more preferably at least 90% by weight, of all the polymer particles are present in the particle diameter range of from 150 μm to 3 mm. When particles having a diameter of less than 150 μm are present in an amount of more than 30% by weight, there is sometimes a problem in the procedure of drying the polymer with hot air. On the other hand, particles having a diameter of greater than 3 mm are often formed when aggregates of polymer particles are formed during the polymerization. In this case, the polymer greatly adheres to the internal surface of a polymerization apparatus, which causes a big problem in separating and recovering the polymer.

Generally, the particle size distribution can be controlled on the basis of the conditions for the polymerization. The main factors which affect the particle size distribution of formed particles include the particle size and particle size distribution of carrier particles and the amount ratio of the carrier particles to 2-oxetanone. The particle size and particle size distribution of the carrier particles are liable to relatively reflect in formed particles. Generally, when carrier particles having a small particle diameter of up to 150 μm are used, there can be obtained formed particles having a very narrow particle size distribution in which 80% by weight or more of the formed particles are present in the range of 150 to 350 μm. When carrier particles having a small particle diameter of 150 to 500 μm are used, there can be obtained formed particles of which about 90% by weight or more are distributed in the particle diameter range of 500 μm to 3 mm. The influence of the amount ratio of the carrier particles to 2-oxetanone on the diameter of formed particles is of a simple relation, since the diameter of the formed particles is determined depending upon the amount of produced poly(2-oxetanone) that can coat the carrier particles.

When the aggregation of the polymer greatly proceeds, the aggregation reflects not only in an increase in the diameter of formed particles but also in the bulk specific gravity of the formed particles. That is, a space is formed among particles forming aggregates, and the bulk specific gravity decreases. The decrease in the bulk specific gravity affects the flow of the polymer from a hopper to a barrel when the polymer is melt-molded in a molding machine. The particles of the present invention has a bulk specific gravity of 0.3 to 0.6 g/ml, and is well introduced into a barrel. The bulk specific gravity of more than 0.6 g/ml is almost impossible to practically attain as a particulate form.

The present invention will be explained more in detail hereinafter with reference to Examples, while the present invention shall not be limited to these Examples.

EXAMPLE 1

(1) The internal surface of a 500 ml separable three-necked glass flask having a stirrer and a condenser, and a propeller type stirrer blade were spray-coated with an aerosol containing fine particles of an ethylene tetrafluoride resin.

An acetonitrile solution of a tetramethylammonium acetate (concentration $2.065 \times 10^{-7}$ mol/μl) in an amount of 375 μl (77.4 μmol) and 20 ml of acetonitrile were added to 5.00 g of a poly(2-oxetanone) having a particle diameter of 50 to 150 μm (weight average molecular weight 455,000), and the mixture was stirred. Then, the acetonitrile was removed by vaporization under reduced pressure at 40° C. for 4 hours. The remaining particles were used as a polymerization initiator supported on poly(2-oxetanone) particles.

(2) The polymerization initiator supported on poly(2-oxetanone) particles was placed in the separable flask of which the internal surface had been nonpolarized, and the flask was placed in a constant-temperature water bath at 40° C., followed by temperature controlling. Then, a solution of 50.04 g (694.4 mmol) of 2-oxetanone in 250 ml of sec-butyl chloride was added. Then, the stirring of the mixture was initiated at a stirring rate of 400 rpm. The polymerization was carried out for 15 hours, and then, the reaction mixture was filtered to separate a formed poly(2-oxetanone) from the solvent and unreacted monomer. After the solvent and unreacted monomer were completely removed from the poly(2-oxetanone) under reduced pressure, the poly(2-oxetanone) was measured for a weight to show a polymerization ratio of 99.1%. The poly(2-oxetanone) was measured for a molecular weight by size exclusion chromatography (or gel permeation chromatography) to show a weight average molecular weight of 350,000. The poly(2-oxetanone) had a bulk specific gravity of 0.348 g/ml, and had a particle size distribution in the range of more than 1 mm (0%), 1 mm–350 µm (1.4%), 350 µm–150 µm (88.9%), and less than 150 µm (9.7%).

COMPARATIVE EXAMPLE 1

2-Oxetanone was polymerized in the same manner as in Example 1 except that the poly(2-oxetanone) carrier particles were not used and that the same polymerization initiator as that used in Example 1 was directly added. As a result, the polymerization ratio of the formed poly(2-oxetanone) was 99.8%. The poly(2-oxetanone) was measured for a molecular weight by size exclusion chromatography to show a weight average molecular weight of 472,000. The poly(2-oxetanone) had a bulk specific gravity of 0.166 g/ml, and had a particle size distribution in the range of more than 3 mm (9.%), 3–1 mm (4.8%), 1 mm–350 µm (35.7%), 350 µm–150 µm (23.9%), and less than 150 µm (26.4%). As described above, when the polymerization initiator was used without allowing poly(2-oxetanone) to support it, aggregates having a particle diameter of more than 3 mm were formed.

EXAMPLE 2

2-Oxetanone was polymerized in the same manner as in Example 1 except that the poly(2-oxetanone) carrier particles were replaced with poly(2-oxetanone) particles having a weight average molecular weight of 380,000, that the sec-butyl chloride as a solvent was replaced with isopropyl chloride, that the polymerization temperature was changed to the reflux temperature (34.8° C.) of isopropyl chloride and that the polymerization time was changed to 10 hours. As a result, the polymerization ratio of the formed poly(2-oxetanone) was 99.6%. The poly(2-oxetanone) had a weight average molecular weight of 392,000 and a bulk specific gravity of 0.434 g/ml, and had a particle size distribution in the range of more than 1 mm (0%), 1 mm–350 µm (10.9%), 350 µm–150 µm (86.8%), and less than 150 µm (2.3%).

EXAMPLE 3

2-Oxetanone was polymerized in the same manner as in Example 2 except that the tetramethylammonium acetate as a polymerization initiator was replaced with an acetonitrile solution of bis(tetramethylammonium) adipate (concentration 2.05×10$^{-7}$ mol/µl) in an amount of 375 gl (76.9 µmol). The polymerization ratio of the formed poly (2-oxetanone) was 100.0%. The poly(2-oxetanone) had a bulk specific gravity of 0.388 g/ml and a weight average molecular weight of 369,000, and had a particle size distribution in the range of more than 1 mm (0%), 1 mm–350 µm (0.62%), 350 µm–150 µm (73.7%), and less than 150 µm (25.7%).

EXAMPLES 4–6

An acetonitrile solution of tetramethylammonium acetate (concentration 2.065×10$^{-7}$ mol/µl) in an amount of 60 µl (12.4 µmol) and 2 ml of acetonitrile were added to 0.30 g of a poly(2-oxetanone) having a particle diameter of 150 to 350 µm (weight average molecular weight 340,000), and the mixture was stirred.

Then, the acetonitrile was removed by vaporization under reduced pressure at 40° C. for 4 hours. The remaining particles were used as a polymerization initiator supported on poly(2-oxetanone) particles.

0.30 Gram of the polymerization initiator supported on poly(2-oxetanone) particles, 15 ml of a solvent shown in Table 1 and 3 g of 2-oxetanone (41.6 mmol) were placed in a 15 ml polymerization reactor formed of ethylene tetrafluoride, and the reactor was tightly closed. Then, the polymerization was carried out with magnetic stirring (15 hours/40° C.). After the polymerization, the formed poly(2-oxetanone) was filtered, dried and weighed, and then it was measured for a molecular weight and a particle size distribution. Table 1 shows the results of the obtained polymerization ratio, weight average molecular weight and particle size distribution.

COMPARATIVE EXAMPLES 2–4

2-Oxetanone was polymerized in the same manner as in Examples 4 to 6 (15 hours/40° 6C.) except that the solvent as a polymerization solvent was replaced with a solvent shown in Table 1. The formed poly(2-oxetanone) was filtered, dried and weighed in the same manner as in Examples 4 to 6, and then it was measured for a molecular weight and a particle size distribution. Table 1 shows the results of the obtained polymerization ratio, weight average molecular weight and particle size distribution.

When the solubility parameter of the solvent was less than 15.0 MPa$^{1/2}$ as shown in Comparative Examples 2 and 3, the polarity was extremely low so that the formed polymer was liable to form aggregates. On the other hand, when the solubility parameter of the solvent was higher than 18.0 MPa$^{1/2}$ as shown in Comparative Example 4 and the polarity was too high, the polymerization proceeded nearly in a solution polymerization so that no particulate poly(2-oxetanone) was obtained. On the other hand, when the solubility parameter of the solvent was higher than 18.0 MPa$^{1/2}$ as shown in Comparative Example 4 and the polarity was too high, the polymerization proceeded nearly in a solution polymerization so that no particulate poly(2-oxetanone) was obtained.

TABLE 1

| | Solvent (Soluble, Insoluble) (SP: MPa$^{1/2}$) | Polymerization ratio (%) | Weight average molecular weight | Particle size distribution | | |
|---|---|---|---|---|---|---|
| | | | | >3 mm | 3 mm ∫ 150 µm | 150 µm> |
| Ex.4 | Sec-butyl chloride (soluble) (17.4) | 100 | 275,600 | 0 | 82 | 18 |
| Ex.5 | Dimethoxymethane (soluble) | 93.9 | 234,000 | 0 | 85 | 15 |

TABLE 1-continued

|  | Solvent (Soluble, Insoluble) (SP: MPa$^{1/2}$) | Polymer- ization ratio (%) | Weight average molecular weight | Particle size distribution | | |
|---|---|---|---|---|---|---|
|  |  |  |  | >3 mm | 3 mm ∫ 150 μm | 150 μm> |
| Ex.6 | (16.2) n-Propyl acetate (soluble) | 98.7 | 241,000 | 0 | 79 | 21 |
| CEx.2 | (18.0) Diisopropyl ether (soluble) | 96.0 | 269,000 | 78 | 22 | 0 |
| CEx.3 | (14.1) Hexane (insoluble) | 100 | 250,000 | 100 | 0 | 0 |
| CEx.4 | (14.9) Tetrahydrofuran (soluble) (18.8) | 100 | 210,000 | 92 | 8 | 0 |

Ex. = Example, CEx. = Comparative Example
*Soluble, Insoluble: Solubility of 2-oxetanone in a solvent
*SP: Solubility parameter
*Comparative Example 4: During the polymerization, poly(2-oxetanone) swelled and homogeneous mixing was difficult.

EXAMPLE 7

(1) Preparation of starch particles surfacetreated with poly(2-oxetanone) by liquid phase polymerization method An acetonitrile solution of a tetramethylammonium acetate (concentration 2.065×10$^{-7}$ mol/μl) in an amount of 375 μl (77.4 μmol) and 5 ml of acetonitrile were added to 1.5 g of potato starch particles, and the mixture was stirred. Then, the acetonitrile was removed by vaporization under reduced pressure at 40° C. for 4 hours to give starch particles supporting the polymerization initiator.

Figure 1B:

The internal surface of a 500 ml separable three-necked glass flask having a stirrer and a condenser, and a propeller type stirring blade were spray-coated with aerosol containing fine particles of an ethylene tetrafluoride resin. 15 Grams of the above starch particles supporting the polymerization initiator was placed in the above separable flask having the so nonpolarized internal surface. Then, a solution of 50.0 g (694 mmol) of 2-oxetanone in 250 ml of isopropyl chloride was added. Then, the stirring of the mixture was initiated at a stirring rate of 300 rpm. The flask was placed in a constant-temperature water bath at 40° C., followed by temperature control. The polymerization was carried out for 2 hours, and then the reaction mixture was filtered to separate the starch particles coated by formed poly(2-oxetanone) and a combination of the solvent and unreacted monomer. After the solvent and unreacted monomer were completely removed from the starch particles coated by poly(2-oxetanone), the starch particles coated by poly(2-oxetanone) were measured for a weight. The weight of the original starch particles was deducted to show that the polymerization ratio of the poly(2-oxetanone) was 4.3%. The starch particles coated by poly(2-oxetanone) and the original starch particles were observed through a sensitive color plate between crossed polars with a polarization microscope to show that the starch particles coated by poly(2-oxetanone) ((FIG. 1(a)) retained an ellipsoidal form inherent to starch but that the sensitive color of a starch crystal ((FIG. 1(b)) was concealed by a coating of the poly(2-oxetanone). It was thus found that the surfaces of the starch particles were coated with poly(2-oxetanone).

(2) Seed polymerization of 2-oxetanone in the presence of starch particles surfacetreated with poly(2-oxetanone)

An acetonitrile solution of a tetramethylammonium acetate (concentration 2.065×10$^{-7}$ mol/μl) in an amount of 375 μl (77.4 gmol) and 5 ml of acetonitrile were added to 1.0 g of the starch particles surface-treated with poly(2-oxetanone) in the above (1), and the mixture was stirred. Then, the acetonitrile was removed by vaporization under reduced pressure at 40° C. for 4 hours to give polymerization initiator-supporting starch particles surface-treated with poly(2-oxetanone).

The internal surface of a 500 ml separable three-necked glass flask having a stirrer and a condenser, and a propeller type stirring blade were spray-coated with aerosol containing fine particles of an ethylene tetrafluoride resin. Then, 1.0 g of the polymerization initiator-supporting starch particles surface treated with poly(2-oxetanone) were placed in the separable flask having the so nonpolarized internal surface, and a solution of 50.08 g (695 mmol) of 2-oxetanone in 250 ml of isopropyl chloride was added. Then, the stirring of the mixture was initiated at a stirring rate of 300 rpm. The flask was placed in a constant-temperature water bath at 40° C., followed by temperature control. The polymerization was carried out for 15 hours, and then reaction mixture was filtered to separate a formed poly(2-oxetanone) and a combination of the solvent and unreacted monomer. The solvent and unreacted monomer were completely removed from the poly(2-oxetanone) under reduced pressure, the poly(2-oxetanone) was measured for a weight to show a polymerization ratio of 99.4%. The poly(2-oxetanone) was measured for a molecular weight by size exclusion chromatography to show a weight average molecular weight of 380,000. The poly(2-oxetanone) had a bulk specific gravity of 0.390 g/ml, and had a particle size distribution in the range of more than 1 mm (0%), 1 mm–710 μm (0.6%), 710–500 μm (0.9%), 500–350 μm (1.9%), 350–150μ (79.3%) and less than 150 μm (17.3%). The poly(2-oxetanone) was a particulate poly (2-oxetanone) free of aggregates.

COMPARATIVE EXAMPLE 6

2-Oxetanone was polymerized in the same manner as in Example 7 except that the starch particles surface-treated with poly(2-oxetanone) were replaced with 1.0 g of potato starch particles which directly supported the polymerization initiator. As a result, the formed poly(2-oxetanone) had a polymerization ratio of 98.8%, a weight average molecular weight of 371,000 and a bulk specific gravity of 0.201 g/ml. The particle size distribution thereof was in the range of more than 3 mm (16.3%), 3–1 mm (4.5%), 1 mm–710 µm (7.9%), 710–500 µm (6.2%), 500–350 µm (5.8%), 350–150µ (27.2%) and less than 150 µm (31.6%). A component having a particle size of more than 3 mm was of aggregates.

COMPARATIVE EXAMPLE 7

2-Oxetanone was polymerized in the same manner as in Example 7 except that the polymerization reactor used in Example 7(2) was replaced with a polymerization reactor of which the internal surface was not nonpolarized. As a result, the formed poly(2-oxetanone) had a polymerization ratio of 99.0%, a weight average molecular weight of 320,000 and a bulk specific gravity of 0.288 g/ml. Aggregates having a diameter of more than 3 mm amounted to 21.0% by weight, and the amount of particles having a diameter of less than 150 µm was 15%.

EXAMPLE 8

The (1) preparation of starch particles surface-treated with poly(2-oxetanone) by a liquid phase polymerization method and the (2) seed polymerization of 2-oxetanone in the presence of the starch particles surface-treated with poly(2-oxetanone) were carried out in the same manner as in Example 7 except that the isopropyl chloride as a polymerization solvent was replaced with sec-butyl chloride. As a result, the polymerization ratio of the poly(2-oxetanone) in the surface treatment was 5.8%, and the polymerization ratio in the seed polymerization was 99.2%. The poly(2-oxetanone) was measured for a molecular weight by size exclusion chromatography to show a weight average molecular weight of 310,000. The poly(2-oxetanone) had a bulk specific gravity of 0.372 g/ml, and had a particle size distribution in the range of more than 1 mm (0%)), 1 mm–710 µm (0.5%), 710–500 µm (1.4%), 500–350 µm (3.6%), 350–150 µm (70.3%) and less than 150 µm (24.2%).

EXAMPLE 9

(1) Preparation of starch particles surfacetreated with poly(2-oxetanone) by gas phase polymerization method An acetonitrile solution of a tetramethylammonium acetate (concentration 2.065×10$^{-7}$ mol/gl) in an amount of 1.5 ml (309.8 µmol) and 30 ml of acetonitrile were added to 20.0 g of potato starch particles, and the mixture was stirred. Then, the acetonitrile was removed by vaporization under reduced pressure at 40° C. for 4 hours to give starch particles supporting the polymerization initiator.

Figure 2:
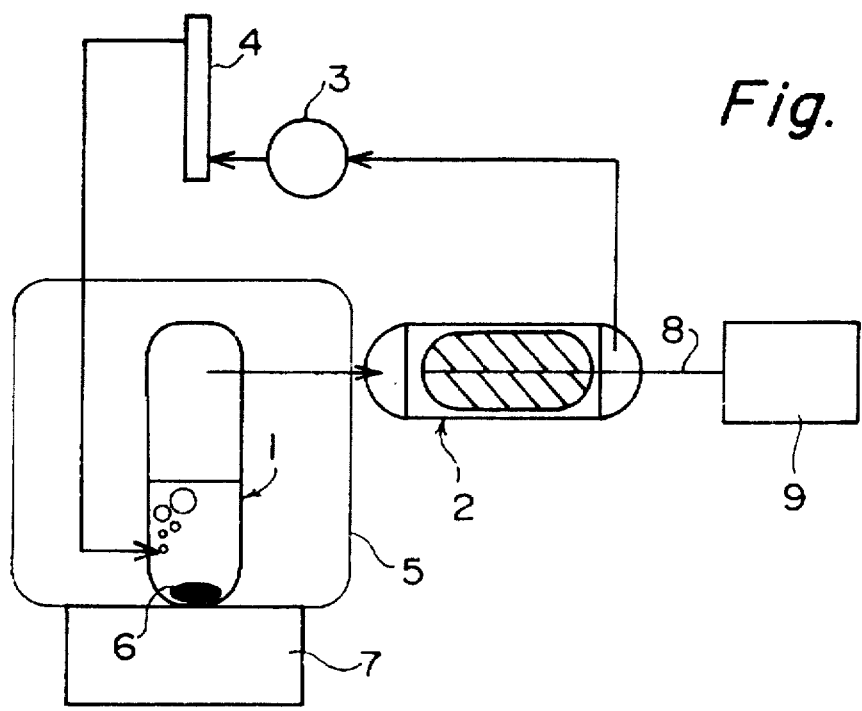
FIG. 2 schematically shows a circulatory gas-phase polymerization apparatus used in Example 9 of the present invention.

(i) Preparation of circulation gas phase polymerization apparatus (see FIG. 2)

In FIG. 2, the numerals stands for as follows. 1 is a vaporization apparatus portion; 2, a polymerization apparatus portion; 3, a circulating pump; 4, a gas flow rate controller, 5, a constant-temperature bath;, 6, a stirrer; 7; a magnetic stirring device; 8, a stirrer vane; and 9, a motor for stirring. This explanation for numerals is also applied to FIG. 3 later described.

2-Oxetanone vaporization apparatus portion: A two-branched egg-plant type flask having an internal volume of 30 ml was charged with 10 g (139 mmol) of 2-oxetanone and 0.39 g (1.48 mmol) of 5-(2,5-dioxotetrahydrofuryl)-3-methyl-3-cyclohexene-1,2-dicarboxylic acid anhydride as a polymerization inhibitor.

Polymerization apparatus portion: 20.0 Grams of the starch particles supporting the polymerization initiator, prepared in (1), were placed in a 100-ml polymerization tube, and mechanically stirred by rotating the tube.

Connection portion: The 2-oxetanone vaporization apparatus portion, the polymerization apparatus portion and a circulating pump were combined to form a circulating gas phase polymerization apparatus (FIG. 2).

(ii) Gas phase polymerization

The 2-oxetanone vaporization apparatus portion was placed in a constant-temperature bath at 40° C., and the circulating pump was started. Air was used as a circulating gas, and the circulation rate was set at 50 ml/minute. After 19.5 hours, a content in the polymerization apparatus portion was taken out and measured for a weight to show 20.5 g. The amount of a poly(2-oxetanone) newly formed in the presence of the initiator supported by starch particles was 0.5 g. The starch particles was observed through a polarization microscope and measured for a Fourier transformation infrared absorption spectrum to show an absorption at 1,730 cm$^{-1}$ based on ester carbonyl group. It was found on the basis of this result that the surfaces of the starch particles were coated with poly(2-oxetanone).

(2) Seed polymerization of 2-oxetanone in the presence of starch particles surfacetreated with poly(2-oxetanone)

(1) 2-Oxetanone was polymerized in the same manner as in Example 7(2) except that 1.0 g of the starch particles surface-treated with poly(2-oxetanone), prepared in (1), and that the polymerization temperature was set at 35° C. As a result, the polymerization ratio was 98.8%, the weight average molecular weight was 320,000, the bulk specific gravity was 0.215 g/ml, and the particle size distribution was in the range of more than 1 mm (0%), 1 mm–710 am (1.7%), 710–500 µm (2.9%), 500–350 µm (6.%), 350–150 µm (63.3%) and less than 150 µm (25.7%).

EXAMPLES 10–13

(1) Preparation of various particles surface-treated with poly(2-oxetanone) by gas phase polymerization method An acetonitrile solution of a tetramethylammonium acetate (concentration 2.0×10$^{-8}$ mol/µl) in an amount of 10 ml (200 µmol) and 5 ml of acetonitrile were added to 10.0 g of particles shown in Table 2, and the mixture was stirred. Then, the acetonitrile was removed by vaporization under reduced pressure at 40° C overnight to give various particles supporting the polymerization initiator.

Figure 3:
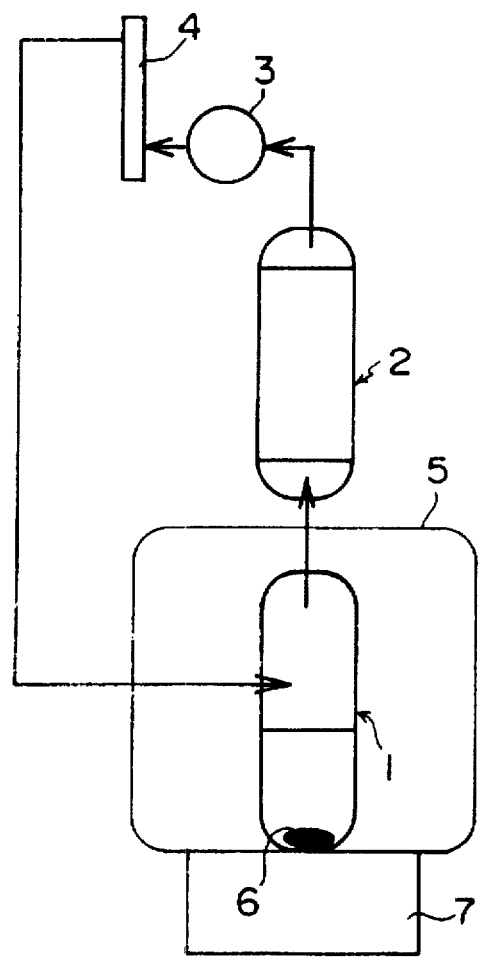
FIG. 3 schematically shows a circulatory gas-phase polymerization apparatus used in Examples 10 to 13 of the present invention.

(i) Preparation of circulation gas phase polymerization apparatus (see FIG. 3)

2-Oxetanone vaporization apparatus portion: A two-branched egg-plant type flask having an internal volume of 30 ml was charged with 10 g (139 mmol) of 2-oxetanone and 0.39 g (1.48 mmol) of 5-(2,5-dioxotetrahydrofuryl)-3-methyl-3-cyclohexene-1,2-dicarboxylic acid anhydride as a polymerization inhibitor.

Polymerization apparatus portion: 5.0 Grams of the particles supporting the polymerization initiator, prepared in (1), were placed in a 50-ml polymerization tube.

Connection portion: The 2-oxetanone vaporization apparatus portion, the polymerization apparatus portion and a circulating pump were combined to form a circulating gas phase polymerization apparatus (FIG. 3).

(ii) Gas phase polymerization

The 2-oxetanone vaporization apparatus portion was placed in a constant-temperature bath at 40° C., and the circulating pump was started. Air was used as a circulating gas, and the circulation rate was set at 3,000 ml/minute. After 1 hour, the particles in the polymerization apparatus portion were taken out and measured for a weight to show that the amount of a poly(2-oxetanone) newly formed in the presence of the initiator supported by various particles was 0.1 to 0.5 g.

(2) Seed polymerization of 2-oxetanone in the presence of various particles surfacetreated with poly(2-oxetanone)

2-Oxetanone was polymerized in the same manner as in Example 9(2) except that 1.0 g of the particles surface-treated with poly(2-oxetanone), prepared in (1), were used and that the polymerization time was set for 20 hours. As a result, all the polyerization systems showed the formation of particulate poly(2-oxetanone) which was almost free of aggregates. Table 2 shows polymerization ratios, weight average molecular weights and weight percentages of aggregates having a particle diameter of more than 3 mm.

COMPARATIVE EXAMPLES 8–11

2-Oxetanone was seed-polymerized in the presence of particles shown in Table 2 in the same manner as in Examples 10–13(2) except that the surface treatment with poly(2-oxetanone) in Examples 10–13(1) was not carried out. Table 2 shows polymerization ratios, weight average molecular weights and weight percentages of aggregates having a particle diameter of more than 3 mm. As is clear in the results in Table 2, a larger amount of aggregates having a particle diameter of more than 3 mm were formed in the presence of particles of which the surfaces were not treated with poly(2-oxetanone).

TABLE 2

| | Particles | Polymerization ratio (%) | Weight average molecular weight | Particle size distribution >3 mm (%) |
|---|---|---|---|---|
| Ex.10 | Poly(3-hydroxy-butylate), formed by emulsion dispersion method (diameter about 100 μm) | 98.7 | 328,000 | 0.0 |
| Ex.11 | Calcium oxide | 99.7 | 349,000 | 0.0 |
| Ex.12 | Quartz powder | 99.5 | 330,000 | 0.0 |
| Ex.13 | Calcium carbonate | 99.0 | 291,000 | 0.0 |
| CEx.8 | Calcium oxide | 99.9 | 368,000 | 30.1 |
| CEx.9 | Quartz powder | 99.3 | 318,000 | 19.3 |
| CEx.10 | Calcium carbonate | 99.0 | 270,000 | 46.0 |

EXAMPLE 14

The internal surface of a 35-liter stainless steel polymerization reactor having a stirrer and a condenser, and a brumagin/propeller type stirring blade were nonpolarized by spray-coating them with aerosol containing an ethylene tetrafluoride resin.

An acetonitrile solution of a tetramethylammonium acetate (concentration $2.065 \times 10^{-7}$ mol/μl) in an amount of 34.5 ml (7.12 mmol) was added to 92 g of a poly(2-oxetanone) having a particle diameter of 150 to 350 μm (weight average molecular weight 455,000), and the mixture was stirred. Then, the acetonitrile was removed by vaporization under reduced pressure at 40° C. for 4 hours. The remaining particles were used as a polymerization initiator supported on poly(2-oxetanone) particles. This polymerization initiator supported on poly(2-oxetanone) and 9 liters of isopropyl chloride were placed in a polymerization reactor of which the internal surface had been nonpolarized. Then, a solution of 4.6 kg (63.84 mol) of 2-oxetanone in 14 liters of isopropyl chloride was added. Then, the stirring of the mixture was initiated at a stirring rate of 150 rpm, and the polymerization reactor was externally heated to 35° C. to initiate the polymerization. The polymerization was carried out for 20 hours, and then the reaction mixture was filtered to separate a particulate poly(2-oxetanone) and a combination of the solvent and unreacted monomer. The solvent and unreacted monomer were completely removed from the poly(2-oxetanone) under reduced pressure, and then, the poly(2-oxetanone) was measured for a weight to show a polymerization ratio of 99.5%. The poly(2-oxetanone) was measured for a molecular weight by size extrusion chromatography to show a weight average molecular weight of 412,000 and a number average molecular weight of 183,000. The poly(2-oxetanone) had a bulk specific gravity of 0.5052 g/ml and a particle size distribution in the range of more than 3 mm (0%), 3–1 mm (10.18%), 1 mm–710 μm (61.97%), 710–500 μm (24.07%), 500–350 μm (2.58%), 350–150 μm (0.91%) and less than 150 μm (0.28%)

EXAMPLE 15

A poly(2-oxetanone) used in Example 16 was prepared by the following polymerization method, and a poly(2-oxetanone) used in each of Example 17 and Examples thereafter was prepared in the same manner as in the following polymerization method.

The internal surface of a 35-liter stainless steel polymerization reactor having a stirrer and a condenser, and a brumagin/propeller type stirring blade were nonpolarized by spray-coating them with aerosol containing an ethylene tetrafluoride resin.

A polymerization initiator supported on a carrier, in which 1.03 g (773 mmol) of tetramethylammonium acetate was supported on 100 g of poly(2-oxetanone) particles having a particle diameter of 150 to 350 μm (weight average molecular weight 454,000), and 10 liters of isopropyl chloride were added in the polymerization reactor of which the internal surface had been nonpolarized. Then, a solution of 5 kg (69.39 mol) of 2-oxetanone in 15 liters of isopropyl chloride was added. Then, the stirring of the mixture was initiated at a stirring rate of 150 rpm, and the polymerization reactor was externally heated to 35° C. to initiate the polymerization. The polymerization was carried out for 20 hours, and then, the reaction mixture was filtered to separate a formed particulate poly(2-oxetanone) and a combination of the solvent and unreacted monomer. The solvent and unreacted monomer were completely removed from the poly(2-oxetanone) under reduced pressure, and then, the poly(2-oxetanone) was measured for a weight to show a polymerization ratio of 99.2%. The poly(2-oxetanone) was measured for a molecular weight by size extrusion chromatography to show a weight average molecular weight of 412,000 and a number average molecular weight of 183,000. The poly(2-oxetanone) had a bulk specific gravity of 0.3788 g/ml.

REFERENTIAL EXAMPLE 1

The distribution of microorganisms which degrade poly (2-oxetanone) in environments was evaluated by a method using a polymer-emulsified dispersion agar medium (Nishida, Tokiwa, Journal of Environmental Polymer Degradation, Vo. 1, No. 3, 227 (1993). Two types of agar media, a nutrition-poor medium (inorganic salts+yeast extract: 250 ppm) and a nutrition-rich medium (nutrient broth: 8,000 ppm), were used.

Preparation of nutrition-poor media: 0.8 Gram of a poly (2-oxetanone) having a viscosity average molecular weight of 153,000 was dissolved in 40 ml of methylene chloride, and this polymer solution was mixed with 1,000 ml of a nutrition-poor medium containing 100 ppm of a surfactant. Then, the mixture was emulsified and dispersed with a homogenizer at 8,000 rpm to give an emulsified dispersion. 15 Grams of agar was added to the emulsified dispersion and dissolved under heat on a boiling water bath with stirring, and at the same time, the methylene chloride was removed from the medium by vaporization. After the agar medium was completely dissolved and after the vaporization of the methylene chloride was completed, the emulsified dispersion was sterilized in an autoclave at 120° C. for 20 minutes. Then, it was divided and poured into petri dishes, and allowed to cool under an ultraviolet light lamp to prepare agar media for evaluation.

Preparation of nutrition-rich agar media: Agar media for evaluation were prepared in the same manner as in the preparation of nutrition-poor media except that the nutrition-poor medium was replaced with 1,000 ml of a nutrition-rich medium.

Collection of soil samples from environments: Soil samples were collected in 10 places in and near Tsukuba-shi, Ibaragi-ken, Japan, as shown in Table 3 on Jun. 2 and 12, 1992.

TABLE 3

| Kind of collected environmental samples | | |
|---|---|---|
| No. | Sample | Place of collection |
| 1 | Forest, Cryptomeria-planted soil | Tsukuba-san mountain |
| 2 | On pavement, Sandy soil | In the city of Tsukuba |
| 3 | River water | Tsukuba-shi, Osone, Sakuragawa |
| 4 | Soil of woods | Tsukuba-shi, Yukarino-mori woods park |
| 5 | Pond bottom mud | Tsuchiura-shi, Shishi-zuka Oike pond |
| 6. | Paddy field creek bottom mud | Tsukuba-shi, Hasunuma |
| 7 | Upland soil | Tsukuba-shi, Matsunogi |
| 8 | Paddy field soil | Niibarimura village, Fujisawa |
| 9 | Bark saw dust cow dung compost | Shin-Nippon Rakuno Kenkyujo |
| 10 | Weed land soil | Tsukuba-shi, Wadai |

Figure 4:
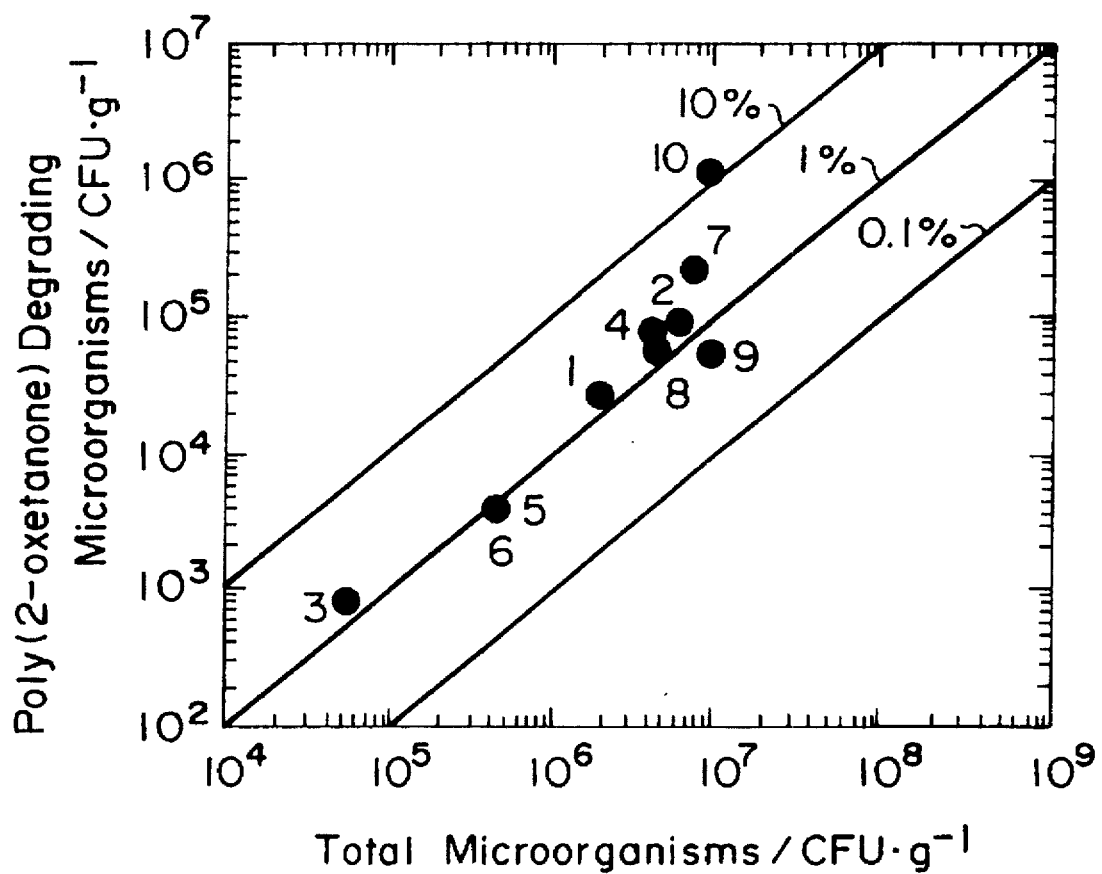
FIG. 4 shows a distribution of poly(2-oxetahone)-degrading microorganisms in environments with a nutrition-poor agar medium, measured in Referential Example 1 of the present invention.
Figure 5:
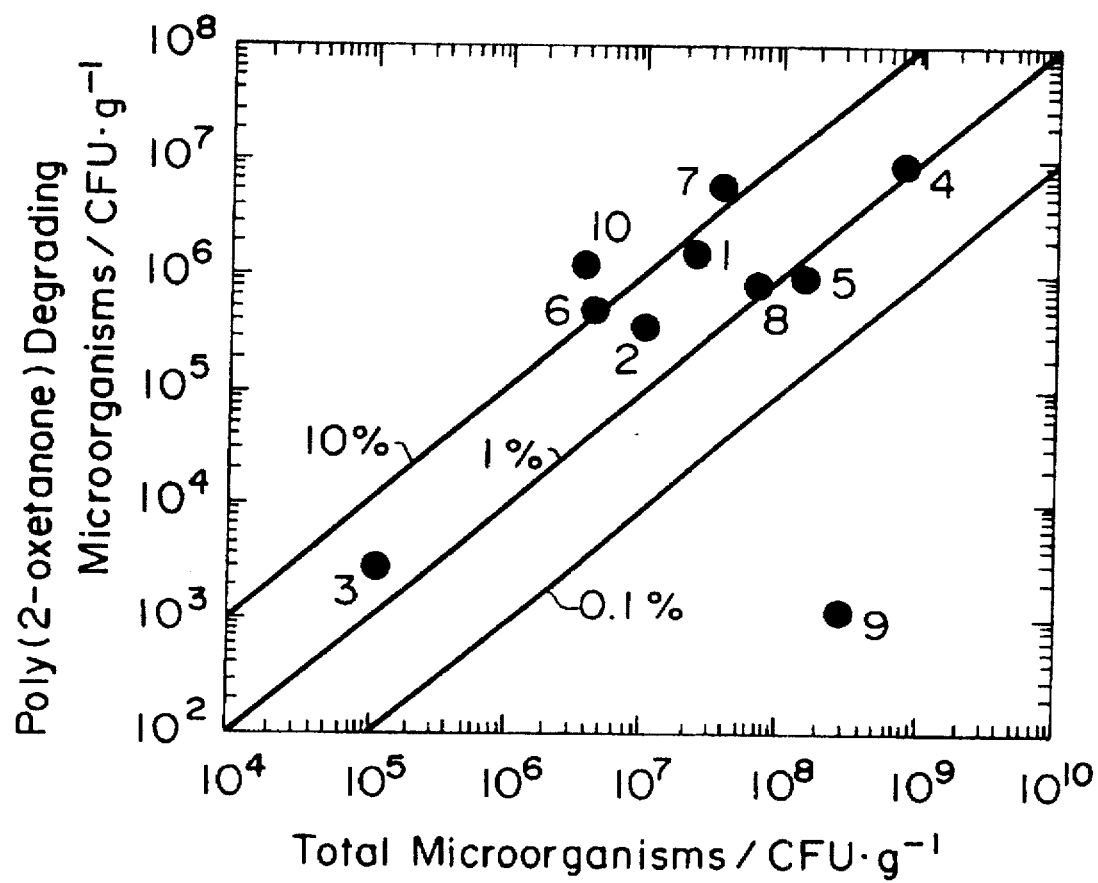
FIG. 5 shows a distribution of poly(2-oxetanone)-degrading microorganisms in environments with a nutrition-rich agar medium, measured in Referential Example 1 of the present invention.

Stationary culture: Each of samples collected in environments shown in Table 3 was dispersed in 9 ml of a medium of inorganic salts to prepare dilute base liquids. Table 4 shows concentrations of the dilute base liquids. The dilute base liquids were further diluted to $10^2$ to $10^8$ times with a medium of inorganic salts. Each diluted liquid in an amount of 0.1 ml was inoculated ated on the nutrition-poor medium and the nutrition-rich medium with a spreader. The samples were stationary-cultured in a constant-temperature chamber at 30° C. With the passage of culturing time, colonies of microorganisms formed on each agar medium, and further, around each colony of microorganisms which degraded poly(2-oxetanone), a transparent circular zone (clear zone) which was formed by the degradation of poly(2-oxetanone) appeared. The number of the colonies which appeared on each agar medium was counted to determine the total number of microorganisms in each sample and the number of the clear zones was counted to determine the number of poly(2-oxetanone)-degrading microorganisms. The culturing on the nutrition-poor media was carried out for 31 days, and the culturing on the nutrition-rich media was carried out for 6 days. FIGS. 4 and 5 show the count results after the culturing.

The results in FIGS. 4 and 5 show that poly(2-oxetanone)-degrading microorganisms were present in all the collected samples, and the proportion of these microorganism based on the total number of microorganisms was 0.60 to 12.5% in the nutrition-poor media, and 0.0004 to 33.33% in the nutrition-rich media.

The above results show that poly(2-oxetanone) is a material excellent in biodegradability.

TABLE 4

| Concentration of sample in dilute base liquid | | |
|---|---|---|
| | Dilute base liquid concentration (g/9 ml) | |
| No. | Base liquid for nutrition-poor medium | Base liquid for nutrition-rich medium |
| 1 | 0.2078 | 0.1280 |
| 2 | 0.0917 | 0.0866 |
| 3 | 1.0135 | 1.0168 |
| 4 | 0.0701 | 0.1090 |
| 5 | 1.0026 | 1.0682 |
| 6 | 1.0355 | 0.9462 |
| 7 | 0.0581 | 0.0823 |
| 8 | 1.0014 | 1.1798 |
| 9 | 0.1056 | 0.4163 |
| 10 | 0.1017 | 0.0831 |

EXAMPLE 16

Preparation of T-die extrusion film: Poly(2-oxetanone) particles (weight average molecular weight 412,000, number average molecular weight 183,000) were introduced to an extruder having a barrel which had a diameter of 40 mm and was equipped with a T-die, and fed to the barrel with a screw at a barrel temperature of 90° to 110° C. at a T-die temperature of 106° to 110° C. to extrude a melt film through a T-die slit. The extruded melt film of poly(2-oxetanone) was solidified by cooling it with a chilled roll in which water having at temperature of approximately 23° to 26° C. was circulating, and taken up with a take-up machine to give an unstretched film having a thickness of approximately 250 to 280 μm (Sample No. 1).

Preparation of monoaxially roll-stretched films: The above unstretched film was stretched in the machine direction with a heating roll disposed between a slow-rotation (front) roll and a fast-rotation (back) roll to prepare monoaxially roll-stretched films (Samples Nos. 2 to 9). Table 5 shows temperatures of the heating roll and stretch ratios.

Preparation of tenter method biaxially stretched films: The unstretched film was simultaneously biaxially stretched at a temperature shown in Table 6 with a film stretching machine supplied by Brueckner to obtain a simultaneously biaxially stretched film (Sample No. 12), and the film (Sample No. 8) obtained by monoaxially roll-stretching the unstretched film at 75° C. at a stretch ratio of 4.5 was transversely stretched at a temperature shown in Table 6 with a film stretching machine supplied by Brueckner to obtain consecutively biaxially stretched films (Samples Nos. 10 and 11).

Measurement of tensile strength: A sample for a tensile test, having a width of 10 mm and a length of 80 mm, was taken, and tested for a tensile strength at 23° C. at an inter-chuck distance of 40 mm and at a tension rate of 10 mm/minute. Ten samples were prepared from the film of one kind, and the 10 samples were measured as above. A largest value and a smallest value were omitted, and the remaining eight values were averaged to determine a tensile break strength and a breaking extension.

Tables 5 and 6 show tensile break strength values and breaking extension values. These values are equivalent to, or higher than, those of generally used polyethylene films, which shows that the film of poly(2-oxetanone) can be fully practically used.

TABLE 5

Formation and physical properties of unstretched film and monoaxially roll-stretched films

| Sample No. | Heating temperature on roll (°C.) | Stretch ratio (times) | Tensile break strength (kgf/cm$^2$) | Breaking extension (%) |
|---|---|---|---|---|
| 1 | Unstretched film | | 334 | 535 |
| 2 | 23 | 14.4 | 4,720 | 28 |
| 3 | 50 | 7.7 | 2,950 | 69 |
| 4 | 70 | 5.5 | 2,300 | 145 |
| 5 | 70 | 5.0 | 1,870 | 124 |
| 6 | 70 | 4.2 | 1,660 | 145 |
| 7 | 75 | 6.0 | 2,200 | 92 |
| 8 | 75 | 4.5 | 1,850 | 101 |
| 9 | 75 | 4.0 | 1,350 | 111 |

TABLE 6

Formation and physical properties of biaxially stretched films

| Sample No. | Stretching temperature (°C.) | Stretch ratio (times) | Tensile break strength (kgf/cm$^2$) MD | TD | Breaking extension (%) MD | TD |
|---|---|---|---|---|---|---|
| Consecutively stretched | | | | | | |
| 10 | 78 | (x4.5) x4.4 | 1,370 | 1,340 | 260 | 98 |
| 11 | 75 | (x4.5) x4.0 | 2,050 | 2,010 | 280 | 103 |
| Biaxially stretched | | | | | | |
| 12 | 70 | x3.7 x2.2 | 1,960 | 1,240 | 147 | 420 |

EXAMPLE 17

Preparation of T-die extrusion film: Poly(2-oxetanone) particles (weight average molecular weight 407,000, number average molecular weight 158,000) were mixed with 5% by weight, based on the poly(2-oxetanone) particles, of talc, and the mixture was introduced to an extruder having a barrel which had a diameter of 40 mm and was equipped with a T-die, and fed to the barrel with a screw at a barrel temperature of 90° to 110° C. at a T-die temperature of 106° to 110° C. to extrude a melt film through a T-die slit. The extruded melt film of the poly(2-oxetanone)/talc mixture was solidified by cooling it with a chilled roll in which water having a temperature of approximately 23° to 26° C. was circulating, and taken up with a take-up machine to give an unstretched film having a thickness of approximately 250 to 280 µm (Sample No. 13).

Preparation of monoaxially roll-stretched films: The above unstretched film was stretched in the machine direction with a heating roll disposed between a slow-rotation (front) roll and a fast-rotation (back) roll to prepare mono-axially roll-stretched films (Samples Nos. 14 to 16). Table 7 shows temperatures of the heating roll and stretch ratios.

Preparation of tenter method biaxially stretched films: The film (Sample No. 16) obtained by monoaxially roll-stretching the unstretched film at 75° C. at a stretch ratio of 4.6 was transversely stretched at a temperature and a stretch ratio shown in Table 8 with a film stretching machine supplied by Brueckner to obtain consecutively biaxially stretched films (Samples Nos. 17 and 18).

Measurement of tensile strength: Measured in the same manner as in Example 16.

Tables 7 and 8 show tensile break strength values and breaking extension values. These values are equivalent to, or higher than, those of generally used polyethylene films, which shows that the film of poly(2-oxetanone) can be fully practically used.

TABLE 7

Formation and physical properties of talc-containing unstretched film and monoaxially roll-stretched films

| Sample No. | Heating temperature on roll (°C.) | Stretch ratio (times) | Tensile break strength (kgf/cm$^2$) | Breaking extension (%) |
|---|---|---|---|---|
| 13 | Unstretched film | | 320 | 560 |
| 14 | 75 | 3.4 | 1,220 | 115 |
| 15 | 75 | 4.0 | 1,440 | 150 |
| 16 | 75 | 4.6 | 1,450 | 126 |

TABLE 8

Formation and physical properties of talc-containing biaxially stretched films

| Sample No. | Stretching temperature (°C.) | Stretch ratio (times) | Tensile break strength (kgf/cm$^2$) MD | TD | Breaking extension (%) MD | TD |
|---|---|---|---|---|---|---|
| 17 | 74.5 | (x4.6) x4.0 | 1,830 | 1,210 | 87 | 220 |
| 18 | 74 | (x4.6) x3.3 | 1,590 | 1,700 | 184 | 102 |

EXAMPLE 18

Preparation of pellets: Poly(2-oxetanone) particles (weight average molecular weight 392,000, number average molecular weight 110,000) were mixed with 5% by weight, based on the poly(2-oxetanone) particles, of talc, and the mixture was fed to an extruder at a barrel temperature of 50° to 100° C. to extrude strands through a die. The strands were cooled in a water tank and then cut to obtain pellets. The pellets were dried in an oven at 50° C. overnight.

Preparation of inflation film: The above pellets were introduced to an extruder having a barrel which had a diameter of 40 mm and was equipped with an inflation molding die, and fed to the barrel with a screw at a barrel temperature of 100° to 110° C. at a die temperature of 95° to 100° C. to extrude a melt cylindrical film through a die slit. The extruded melt cylindrical film of the poly(2-oxetanone)/talc mixture was cooled and solidified by blowing it up with cold air blown from the central portion of the die, and the cylindrical film which had been blown up was taken up with a take-up machine to give an inflation film having a width of 330 mm and a thickness of approximately 20 to 25 μm (Sample No. 19).

Preparation of monoaxially roll-stretched film: The unstretched inflation film was stretched 4.8 times in the machine direction with a heating roll having a temperature of 61° C., disposed between a slow-rotation (front) roll and a fast-rotation (back) roll, to prepare a monoaxially roll-stretched film (Sample No. 20).

Measurement of tensile strength: Measured in the same manner as in Example 16.

Table 9 shows tensile break strength values and breaking extension values. These values are equivalent to, or higher than, those of generally used polyethylene films, which shows that the film of poly(2-oxetanone) can be fully practically used.

TABLE 9

Formation and physical properties of talc-containing inflation film and monoaxially stretched film

| Sample No. | Heating temperature on roll (°C.) | Stretch ratio (times) | Tensile break strength (kgf/cm²) | Breaking extension (%) |
|---|---|---|---|---|
| 19 | Unstretched film | | 350 | 490 |
| 20 | 61 | 4.8 | 1,950 | 27 |

EXAMPLE 19

The films (Nos. 1, 8, 10, 12, 13, 16 and 18) prepared in Examples 16 and 17 were measured for water vapor transmission rates at 40° C. by a cup method according to JIS Z-0208. Values of the water vapor transmission rate (g/m²·24 hr) were normalized to values per a unit of 25 μm to formulate values of water vapor transmission rate (g/m²·24 hr·25 μm) in the present invention.

Table 10 shows the results. It was found that the above films had high water vapor transmission rates than other films shown as comparative films in Table 10.

COMPARATIVE EXAMPLES 11

Four generally used films, i.e., nylon 6, polyethylene terephthalate, biaxially oriented polypropylene and high-density polyethylene films, were measured for water vapor transmission rates in the same manner as in Example 18. Table 10 shows the results.

TABLE 10

Water vapor transmission rate

| Sample No. | Sample | Water vapor transmission rate *1 |
|---|---|---|
| Example 19 | | |
| 1 | Poly(2-oxetanone), unstretched | 350 |
| 8 | Poly(2-oxetanone), | 607 |

TABLE 10-continued

Water vapor transmission rate

| Sample No. | Sample | Water vapor transmission rate *1 |
|---|---|---|
| | monoaxially stretched | |
| 10 | Poly(2-oxetanone), consecutively biaxially stretched | 631 |
| 12 | Poly(2-oxetanone), simultaneously biaxially stretched | 493 |
| 13 | Poly(2-oxetanone)/talc, unstretched | 324 |
| 16 | Poly(2-oxetanone)/talc monoaxially stretched | 565 |
| 18 | Poly(2-oxetanone)/talc consecutively biaxially stretched | 504 |
| Comparative Example 11 | | |
| | Nylon 6 | 180 |
| | Polyethylene terephthalate | 22 |
| | Biaxially oriented polypropylene | 6.5 |
| | High-density polyethylene | 5 |

*1 Unit = g/m² · 24 hr · 25 μm

EXAMPLE 20

Film samples (Samples Nos. 1 and 13) having a size of 50×50 mm were prepared from the films obtained in Examples 16 and 17, and measured for water absorption percentages according to JIS K-7209. The water absorption percentage (%) was determined on the basis of the increment of a weight.

TABLE 11

Water absorption percentage

| Sample No. | Sample | Water absorption percentage (%) |
|---|---|---|
| Example 20 | | |
| 1 | Poly(2-oxetanone), unstretched | 0.94 |
| 13 | Poly(2-oxetanone), talc unstretched | 0.95 |

EXAMPLE 21

Test samples (Nos. 8 and 16) having a size of 15×150 mm were taken from each of the films obtained in Examples 16 and 17, and two test samples were attached to each other and subjected to a heat-fusing test. In the heat-fusing, the temperature of a lower seal bar was fixed at 80° C., the temperature of an upper seal bar was set as shown in Table 12, and the sealing was carried out for 1 second or 5 seconds at a load of 1 kgf/cm². The fusion strength was measured according to a peel strength test method in which two films were peeled from each other at 23° C. at a tension rate of 10 mm/minute. In this case, 10 samples were measured each, largest and smallest measurement values were omitted, and the remaining values were averaged to determine a heat-fusion strength (gf/15 mm). Table 12 shows the fusion strength values. It was found that the above films had sufficient high heat-fusion strength.

TABLE 12

| | Heat-fusion strength | |
|---|---|---|
| Upper seal bar temperature (°C.) | Seal time (second) | Heat-fusion strength (gf/15 mm) |
| Example 21 Sample No. 8 | | |
| 77 | 5 | 780 |
| 80 | 1 | 1,390 |
| 82 | 1 | 3,280 |
| 85 | 1 | 2,720 |
| Sample No. 16 | | |
| 73 | 5 | 630 |
| 77 | 1 | 1,670 |
| 77 | 5 | 4,160 |
| 80 | 1 | 4,700 |
| 83 | 1 | 4,530 |

EXAMPLE 22

The films prepared in Examples 16 and 17 (Samples Nos. 8 and 16) were deteriorated in an accelerating manner in a oven at 50° C. at a humidity of 100% to decrease their molecular weights. These films having different molecular weights were used for studying changes in tensile strength and extension with a change in molecular weight.

Molecular weight: Measured for a weight average molecular weight with a size exclusion chromatography.

Measurement of tensile strength: Measured in the same manner as in Example 16.

Table 13 shows the weight average molecular weight, tensile break strength and breaking extension measurement values. It was found that when the weight average molecular weight was at least 20,000, the film retained practically sufficient tensile break strength. However, when the weight average molecular weight was less than 20,000, the film was easily manually torn so that it was insufficient for practical use.

TABLE 13

| Relationship between molecular weight and mechanical properties | | |
|---|---|---|
| Weight average molecular weight | Tensile break strength (kgf/cm²) | Breaking extension (%) |
| Sample No. 8 | | |
| 60,300 | 1,530 | 88 |
| 48,100 | 1,500 | 76 |
| 21,300 | 1,070 | 30 |
| 18,700 | 990 | 21 |
| Sample No. 16 | | |
| 73,800 | 1,300 | 118 |
| 44,200 | 1,120 | 106 |
| 23,400 | 800 | 35 |
| 18,900 | 700 | 16 |

EXAMPLE 23

A melt-extrusion film was prepared from a poly(2-oxetanone) having a weight average molecular weight of 1,663,000 or 729,000, and monoaxially stretched 5 times at 23° C. to obtain a monoaxially stretched film.

Measurement of tensile strength: Measured in the same manner as in Example 16.

Table 14 shows tensile break strength and breaking extension measurement values. The film had practically sufficient tensile break strength.

TABLE 14

| Relationship between molecular weight and mechanical properties | | |
|---|---|---|
| Weight average molecular weight | Tensile break strength (kgf/cm²) | Breaking extension (%) |
| 1,663,000 | 3,810 | 67 |
| 729,000 | 3,700 | 68 |

EXAMPLE 24

A poly(2-oxetanone) copolymer (weight average molecular weight: 187,000 as a poly(2-oxetanone)) containing 16.7% by weight of polyethylene glycol, obtained by block-copolymerizing 2-oxetanone and a polyethylene glycol prepared by ring-opening polymerization of ethylene oxide, and a poly(2-oxetanone) copolymer (weight average molecular weight: 165,000 as a poly(2-oxetanone)) containing 5.3% by weight of polypropylene glycol, obtained by block-copolymerizing 2-oxetanone and a polypropylene glycol prepared by ring-opening polymerization of propylene oxide, were respectively introduced to an extruder having a barrel which had a diameter of 30 mm and was equipped with a T-die, and fed to the barrel with a screw at a barrel temperature of 90° to 105° C. at a T-die temperature of 100° to 105° C. to extrude melt films through a T-die slit. The extruded melt films were solidified by cooling them with a chilled roll in which water having a temperature of approximately 20° to 25° C. was circulating, and taken up with a take-up machine to give unstretched films having a thickness of approximately 150 to 200 µm.

Preparation of monoaxially roll-stretched films: The above unstretched films were stretched 5 times in the machine direction with a heating roll at 70° C. disposed between a slow-rotation (front) roll and a fast-rotation (back) roll to prepare monoaxially roll-stretched films.

Measurement of tensile strength: Measured in the same manner as in Example 16. As a result, the film containing polyethylene glycol had a tensile break strength of 1,030 kgf/cm², and the film containing polypropylene glycol had a tensile break strength of 1,056 kgf/cm². These values are equivalent to, or higher than, that of the tensile break strength of a generally used polyethylene film and sufficient for putting them in practical use.

EXAMPLE 25

The inflation film prepared in Example 18 was cut to a width of 600 mm, and one of the cut portions was heat-fused with a heat sealer. In the heat-fusing, the temperatures of a lower seal bar and a upper seal bar were fixed at 80° C., and the sealing was carried out for 5 seconds at a load of 1 kgf/cm² at a seal width of 10 mm to prepare a bag. 10 Kilograms of kitchen garbage such as vegetables having a water content of about 60% was placed in the bag and allowed to stand in room for 3 days. As a result, no leakage of the kitchen garbage or water by breaking of the film or opening of the bag was found. This bag containing the kitchen garbage was buried 10 to 20 cm deep in a weed field, and after 3 months, it was dug from the ground to show that the film was degraded and that almost all of the film disappeared while the kitchen garbage was composted.

What is claimed is:

1. A biodegradable aliphatic polyester melt-extrusion film, which comprises a biodegradable aliphatic polyester containing a recurring unit of the formula (1),

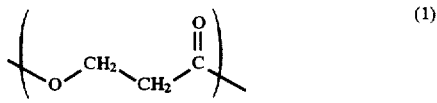

as a main recurring unit and having a weight average molecular weight of 20,000 to 2,000,000, and which has a water vapor transmission rate of 300 to 700 g/m$^2$·24 hours·25 μm and heat-fusing strength of 500 to 5,000 gf/15 mm.

2. The film of claim 1, wherein the biodegradable aliphatic polyester is a homopolymer consisting essentially of the recurring unit of the formula (1).

3. The film of claim 1, wherein the biodegradable aliphatic polyester is composed of at least 80% by weight of the recurring unit of the formula (1) and 20% by weight or less of a recurring unit formed by ring-opening of a cyclic ester or a cyclic ether which gives a recurring unit other than the recurring unit of the formula (1).

4. The film of claim 1, wherein the biodegradable aliphatic polyester has a weight average molecular weight in the range of from 30,000 to 500,000.

5. The film of claim 1, wherein the film has a water vapor transmission rate in the range of from 450 to 700 g/m$^2$·24 hours·25 μm.

6. The film of claim 1, wherein the film has a heat-fusing bond strength of 1,000 to 5,000 gf/15 mm.

7. The film of claim 1, wherein the film contains an inorganic filler.

8. The film of claim 7, wherein the inorganic filler is an alkaline earth metal salt.

9. The film of claim 7, wherein the inorganic filler is contained in an amount of 20% by weight or less based on the biodegradable aliphatic polyester.

* * * * *